United States Patent
Venkiteswaran et al.

(10) Patent No.: US 10,911,324 B2
(45) Date of Patent: Feb. 2, 2021

(54) DECLARATIVE AND REACTIVE DATA LAYER FOR COMPONENT-BASED USER INTERFACES

(71) Applicant: Salesforce.com, Inc., San Francisco, CA (US)

(72) Inventors: Kevin Venkiteswaran, Alameda, CA (US); Diego Ferreiro Val, San Francisco, CA (US); Caridy Patino, San Francisco, CA (US); Trevor James Bliss, Oakland, CA (US)

(73) Assignee: Salesforce.com, Inc., San Francisco, CA (US)

( * ) Notice: Subject to any disclaimer, the term of this patent is extended or adjusted under 35 U.S.C. 154(b) by 0 days.

(21) Appl. No.: 16/450,592

(22) Filed: Jun. 24, 2019

(65) Prior Publication Data

US 2020/0351176 A1 Nov. 5, 2020

Related U.S. Application Data

(60) Provisional application No. 62/840,458, filed on Apr. 30, 2019.

(51) Int. Cl.

| | |
|---|---|
| *G06F 9/451* | (2018.01) |
| *H04L 12/24* | (2006.01) |
| *G06F 9/54* | (2006.01) |
| *H04L 29/08* | (2006.01) |
| *G06F 3/14* | (2006.01) |
| *H04L 29/06* | (2006.01) |
| *G06F 40/221* | (2020.01) |
| *G06F 16/958* | (2019.01) |

(Continued)

(52) U.S. Cl.
CPC ............... *H04L 41/22* (2013.01); *G06F 3/14* (2013.01); *G06F 9/451* (2018.02); *G06F 9/54* (2013.01); *G06F 9/547* (2013.01); *G06F 16/26* (2019.01); *G06F 16/9024* (2019.01); *G06F 16/953* (2019.01); *G06F 16/958* (2019.01); *G06F 40/14* (2020.01); *G06F 40/205* (2020.01); *G06F 40/221* (2020.01); *G06N 20/00* (2019.01); *H04L 63/10* (2013.01); *H04L 67/02* (2013.01); *H04L 67/141* (2013.01); *H04L 67/42* (2013.01); *H04L 67/10* (2013.01)

(58) Field of Classification Search
CPC ......... G06F 9/451; G06F 40/221; G06F 9/547
See application file for complete search history.

(56) References Cited

U.S. PATENT DOCUMENTS

| | | | |
|---|---|---|---|
| 10,116,660 B2 | 10/2018 | Chasman et al. | |
| 10,129,258 B2 | 11/2018 | Chasman et al. | |

(Continued)

*Primary Examiner* — David E Choi
(74) *Attorney, Agent, or Firm* — Kwan & Olynick LLP

(57) ABSTRACT

A wire web component graph that includes a plurality of nodes may be accessed to identify one or more application procedure interfaces (APIs) through which to update one or more data values included in a designated wire web component in a graphical user interface (GUI) being presented on a display device. Each of the data values may correspond to a respective data field represented in the wire web component graph, and each data field may be associated with a respective API in the wire web component graph. The graphical user interface may be updated based on one or more updated data values determined by communicating with the identified APIs over a network and via a communications interface.

20 Claims, 11 Drawing Sheets

(51) Int. Cl.
  *G06N 20/00*  (2019.01)
  *G06F 16/901* (2019.01)
  *G06F 16/26*  (2019.01)
  *G06F 16/953* (2019.01)
  *G06F 40/205* (2020.01)
  *G06F 40/14*  (2020.01)

(56) References Cited

U.S. PATENT DOCUMENTS

| | | |
|---|---|---|
| 10,146,597 B2 | 12/2018 | Pack, III et al. |
| 2010/0257457 A1* | 10/2010 | De Goes .............. H04L 65/1093 715/751 |
| 2014/0156681 A1* | 6/2014 | Lee ..................... G06F 16/9535 707/754 |
| 2015/0120359 A1* | 4/2015 | Dongieux ............. G06F 16/285 705/7.15 |
| 2018/0060371 A1 | 3/2018 | Venkiteswaran et al. |
| 2018/0109434 A1 | 4/2018 | Venkiteswaran et al. |
| 2018/0124027 A1 | 5/2018 | Venkiteswaran et al. |
| 2019/0036929 A1 | 1/2019 | Chasman et al. |
| 2020/0174800 A1* | 6/2020 | Berlitz ................. G06F 16/986 |

* cited by examiner

US 10,911,324 B2

DECLARATIVE AND REACTIVE DATA LAYER FOR COMPONENT-BASED USER INTERFACES

CROSS-REFERENCE TO RELATED APPLICATIONS

This application claims priority under 35 U.S.C. 120 to Provisional U.S. Patent Application 62/840,458 by Venkiteswaran et al., titled "A Declarative and Reactive Data Layer for Component-based User Interfaces", filed Apr. 30, 2019, which is hereby incorporated by reference in its entirety and for all purposes.

FIELD OF TECHNOLOGY

This patent document relates generally to client-server communications for accessing data stored in database systems.

BACKGROUND

"Cloud computing" services provide shared resources, applications, and information to computers and other devices upon request. In cloud computing environments, services can be provided by one or more servers accessible over the Internet rather than installing software locally on in-house computer systems. Users can interact with cloud computing services to undertake a wide range of tasks.

Users often interact with cloud computing systems via HTML-based user interfaces. These user interfaces allow a user to view and/or update information stored in a database system accessible via a cloud computing system. For example, a user interface may present information about a record stored in a database system. Given the ubiquity of such user interfaces, improved techniques for accessing data in database systems via HTML-based user interfaces are desired.

BRIEF DESCRIPTION OF THE DRAWINGS

The included drawings are for illustrative purposes and serve only to provide examples of possible structures and operations for the disclosed inventive systems, apparatus, methods and computer program products for providing component-based user interfaces. These drawings in no way limit any changes in form and detail that may be made by one skilled in the art without departing from the spirit and scope of the disclosed implementations.

DETAILED DESCRIPTION

Figure 1:
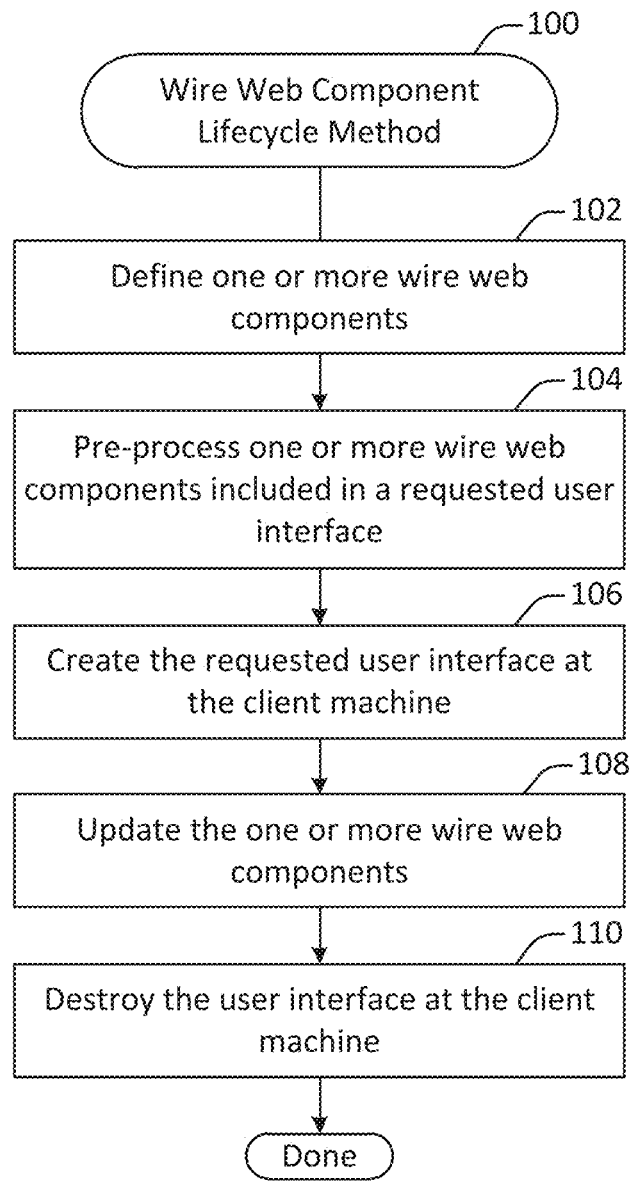
FIG. 1 illustrates an example of a method for a wire web component lifecycle, performed in accordance with one or more embodiments.

Techniques and mechanisms described herein provide for wire web components that simplify and streamline the accessing and updating of data in web-based user interfaces. Many user interfaces rely on the web component meta-specification, which itself is a combination of the Custom Elements specification, the shadow Document Object Model (DOM) specification, the Hypertext Markup Language (HTML) Template specification, and the ECMAScript (ES) Module specification. These four specifications combined allow developers to define their own HTML tags (i.e. custom elements) whose styles are encapsulated and isolated (i.e. a shadow DOM), that can be re-stamped many times (template), and have a consistent way of being integrated into applications (i.e. the ES module).

In conventional systems, web components are used to present static information. That is, a web-based user interface includes a developer-defined custom web component, and upon creation that web component is populated in user interface presented in a browser at a client machine with static information retrieved from a server. Like most elements in the DOM, web components may be manually edited to include different information. However, conventional custom web components do not support automatic updating based on changes made to data elsewhere in the user interface or on the server.

Techniques and mechanisms described herein provide for dynamically updatable wire web components. According to various embodiments, a wire web component may provide for an extensible framework. For example, HTML may be written to provide a layout. The HTML may be included in a wire web component, which may also include programming logic for accessing and update data values to include in the rendered HTML. Developers may then extend the framework to provide custom wire web components used to generate custom user interface portions. The wire web component in a rendered user interface may then be dynamically updated without requiring the developer to specify procedural instructions for performing such updating.

According to various embodiments, a wire web component graph may be used to dynamically update data in a user interface. For example, each wire web component may include one or more data fields, and each data field may be associated with a data value retrievable via a respective API. Each wire web component, data field, and API may be represented as a node in the wire web component graph. The wire web component graph may then be used to guide data access. For example, the wire web component graph may be used to consolidate the number of API requests and avoid retrieving duplicate data.

In some embodiments, the wire web component graph may be used to dynamically update data after the user interface is rendered. For example, an updated data value may be generated by pushing a value from an API to the client machine. As another example, an updated data value may be generated by pulling a value from an API to the client machine. As yet another example, an updated data value may be generated by receiving information from elsewhere in the user interface. For instance, a user interface may display a dual side-by-side workplace. One side of the interface may then provide information such as a page number currently being presented in a scrollable section of the interface. After a data value is updated, the data value may then be provided to any web components in which the data value is included.

In particular embodiments, a declarative framework may provide for static analysis. For example, the server may analyze the user interface to predict data values that may be needed by the client machine. As another example, the server may analyze the user interface to predict component definitions to include in a dynamically generated user interface. As yet another example, a client machine may construct a graph of components included in the user interface.

In some implementations, component-level logic may provide for a component-level view of a data field. For example, a date value may be updated for all components that include the data value. However, the same date value may be presented differently (e.g., "May 1", "May 1, 2005", or "2:30 pm, May 1, 2005") for different web components.

In particular embodiments, wire web components may be added and/or removed from a user interface after the user interface is rendered. For example, a wire web component may be added to a DOM tree. The corresponding wire web component graph may then be updated to include an additional node so that data associated with the wire web component is accessed for providing to the wire web component for display in the user interface. As another example, a wire web component may be removed from the DOM tree. The corresponding wire web component graph may then be updated to remove a node as necessary to avoid downloading unnecessary data.

According to various embodiments, some techniques and mechanisms are described herein with reference to web-based user interface. Further, some techniques and mechanisms described herein are illustrated with examples in which web-based user interfaces are employed. However, the techniques and mechanisms described herein are applicable to a wide variety of computing contexts, including contexts other than web-based user interfaces. For example, although a user interface component may be referred to as a wire web component, such a component need not be implemented in a web-based environment. Indeed, techniques and mechanisms related to wire web components may be applicable in any user interface context in which a user interface is located remotely from the source of some or all of the data presented in the user interface.

Consider the situation of an end user "Alex." Alex is employing a conventional user interface that presents customer relations management (CRM) information associated with database records stored on a server. When Alex changes data such as the name of a customer contact in one part of the user interface, that change is not reflected in another part of the user interface. Further, when a co-worker updates a record during the time when Alex is also viewing the record, the co-worker's update is not reflected in Alex's user interface. This situation can create confusion, race conditions, and inaccurate data.

Now suppose instead that Alex is employing a user interface configured in accordance with an embodiment of techniques and mechanisms described herein. When Alex changes data such as the name of a customer contact in one part of the user interface, that change is reflected elsewhere in the user interface. For example, updating a customer contact name in a detailed record window results in the customer's contact name also changing in a list of customer contacts. Similarly, when a co-worker updates a record during the time when Alex is also viewing the record, the co-worker's update is quickly reflected in Alex's user interface. For instance, when a co-worker on another computer updates the contact record on which Alex is also working to include a new mailing address, that change is reflected in Alex's user interface without requiring that the user interface be refreshed.

FIG. 1 illustrates an example of a method 100 for a wire web component lifecycle, performed in accordance with one or more embodiments. According to various embodiments, the method 100 may be performed at a system that includes a server in communication with a client machine, such as the system 200 shown in FIG. 2.

One or more wire web components are defined at 102. In some implementations, a wire web component may include a custom HTML element and associated computer programming code (e.g., JavaScript) configured for presentation in a graphical user interface implemented via HTML. According to various embodiments, a wire web component is a particular type of wire web component that includes additional logic for automatically performing operations such as auto-updating data on the client and/or server side.

In some implementations, defining a wire web component may involve creating and storing computer programming code that specifies one or more properties associated with a wire web component. One such property for a wire web component may be an identifier and/or address associated with an application procedure interface (API) for retrieving and/or storing information. Another such property may be the identity of one or more data fields for which to retrieve data values via the API. In addition to the information to be accessed, the wire web component definition may specify information such as one or more filtering, processing, and/or updating procedures associated with the information. Additional details regarding a process for defining a custom wire web component are discussed throughout the application, such as with respect to the method 300 shown in FIG. 3.

At 104, one or more wire web components included in a requested user interface are pre-processed at a server. According to various embodiments, a client machine may transmit to the server a request for a user interface. The server may then provide the computing programming instructions necessary for the client to create the user interface. In addition, the server may evaluate the requested user interface to identify and pre-process any wire web components included in the user interface. This pre-processing may include operations such as constructing a data dependency graph of the wire web components and/or pre-fetching data that the client machine is likely to request based on an analysis of the wire web components. Additional details related to pre-processing one or more wire web components are discussed throughout the application, such as with respect to the method 400 shown in FIG. 4.

In particular embodiments, one or more of the wire web components included in the user interface may not be pre-processed. That is, pre-processing may in some instances improve the performance of subsequent requests from the client machine to the server. However, techniques and mechanisms described herein function even in the absence of server-side pre-processing. Server-side pre-processing may be omitted for any of a variety of reasons, such as scarce computational resources, the presence of a particularly complex configuration of wire web components, a determination that pre-processing is likely to yield minimal performance gains, and/or a determination that a wire web component is associated with an external API not accessible via a computing system associated with the server.

The requested user interface is created at the client machine at 106. According to various embodiments, creating the requested user interface may involve performing operations such as constructing a data dependency graph among multiple wire web components, retrieving information for the wire web components from one or more APIs, processing the retrieved information, and/or providing the retrieved information for populating one or more user interface components. Additional details regarding constructing a requested user interface are discussed throughout the application, such as with respect to the method 500 shown in FIG. 5. Additional details regarding constructing dependency graphs are discussed throughout the application, such as with respect to the example 600 of a dependency graph shown in FIG. 6.

The one or more wire web components are updated at 108. In some implementations, a wire web component may continue to be updated as long as it plays an active role in the user interface presented at the client machine. Updating the wire web component may involve operations such as receiving data pushed from the server, pulling data from the server, pushing data to the server, responding to data pull requests from the server, updating local data based on a change made elsewhere in the user interface, and/or any other suitable operations. Additional details regarding updating one or more wire web components are discussed throughout the application, such as with respect to the method 700 shown in FIG. 7.

The user interface at the client machine is destroyed at 110. According to various embodiments, the entire user interface may be destroyed at once. Alternately, a component of the user interface such as a specific wire web component may be destroyed individually when it is no longer needed. For instance, a wire web component may be destroyed when the user interface is updated to no longer include the wire web component. Destroying a wire web component may involve operations such as updating a dependency graph to remove the wire web component, disconnecting a connection to an API for accessing data associated with the wire web component, and/or any other suitable operations. Additional details regarding updating one or more wire web components are discussed throughout the application, such as with respect to the method 800 shown in FIG. 8.

Figure 2:
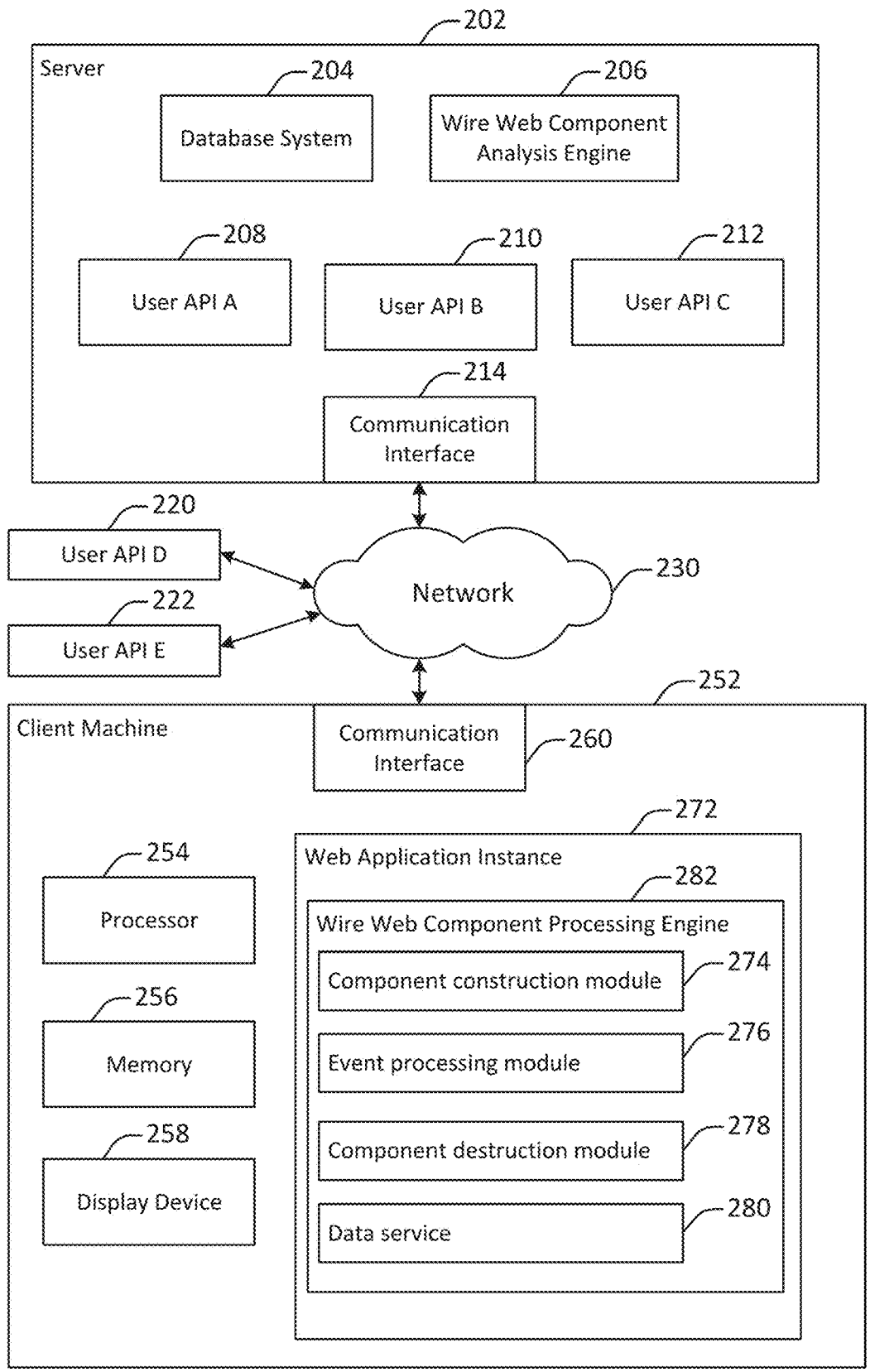
FIG. 2 illustrates an example of an arrangement of components in a client-server communication system, configured in accordance with one or more embodiments.

FIG. 2 illustrates an example of an arrangement of components in a client-server communication system 200, configured in accordance with one or more embodiments. The client-server communication system 200 may be implemented at least in part via one or more components in a cloud such as the systems shown in FIGS. 9, 10A, 10B, and 11. The client-server communication system 200 may be configured to implement all or a portion of one or more of the methods described herein, such as the methods shown in FIGS. 1, 2, 4, 5, 7 and 8.

The client-server communication system 200 includes a server 202. The server 202 includes a database system 204, a wire web component analysis engine 206, a user API A 208, a user API B 210, a user API C 212, and a communication interface 214. In some implementations, the database system 204 may store any suitable information. For example, the database system 204 may store customer relations management (CRM) information, social networking information, or other such data. The database system 204 may include a single database or potentially many different databases. The database system 204 may be arranged in a centralized structure or in a distributed configuration. Additional details about database systems are discussed throughout the application, such with respect to FIGS. 9, 10A, and 10B.

In some embodiments, the wire web component analysis engine 206 may perform one or more of a variety of operations related to wire web components. For example, the wire web component analysis engine 206 may support the creation and/or provisioning of wire web components. Such operations may involve those associated with the definition of wire web components, as discussed with respect to FIG. 3, and/or the pre-processing of wire web components, as discussed with respect to FIG. 4.

According to various embodiments, the user APIs 208 through 212 may be used by a client machine to retrieve information from the server 202. For example, a user API may be used to retrieve information from the database system 204. Different APIs may be used to retrieve different types of information. For instance, one API may be used to access database records, while another API may be used to access a stream of social networking information. Each API may define a protocol for accessing information. In this way, the internal details of information access may be abstracted away from the operation of the client machine.

In some implementations, the communication interface 214 may support communications between the server 202 and one or more remote machines, such as client machines, via a network such as the network 230. The network 230 may include any suitable communications networks. For instance, the network 230 may include the Internet and/or one or more private networks used to communicate with the server 202.

According to various embodiments, the user APIs D 220 and E 222 are external APIs not accessed via the server 202. In some configurations, one or both of these external APIs may be under the control of a service provider associated with the server. Alternately, an external API may be under the control of an entirely different entity. For example, the client machine may communicate with one external API associated with Twitter to access a Twitter feed and may communicate with another external API to access a Facebook feed. That is, techniques and mechanisms described herein may be used to provide wire web components configured to access a variety of user APIs either internal or external to the server 202 that is responsible for providing the wire web component.

The client machine 252 includes a communication interface 260, a processor 254, a memory module 256, a display device 258, and a web application instance 272. According to various embodiments, the client machine 252 may be a desktop computer, a laptop computer, a tablet computer, a mobile phone, or any other suitable computing device.

In some embodiments, the web application instance 272 may include a graphical user interface for accessing information via a network. The web application instance 272 may be generated at least in part based on computer programming language instructions provided by the server 202. The information accessed via the web application instance 272 may be provided by the server 202, by one or more external information sources, or by some combination thereof. The web application instance 272 may be presented in a web browser, in a native application, or in any other suitable manner.

The web application instance 272 includes a wire web component processing engine 282. According to various embodiments, the wire web component processing engine 282 may be used to generate, update, and destroy wire web components in accordance with techniques and mechanisms described herein. The wire web component processing engine may include such components as a component construction module 274, and event processing module 276, a component destruction module 278, and a data service 280.

Figure 3:
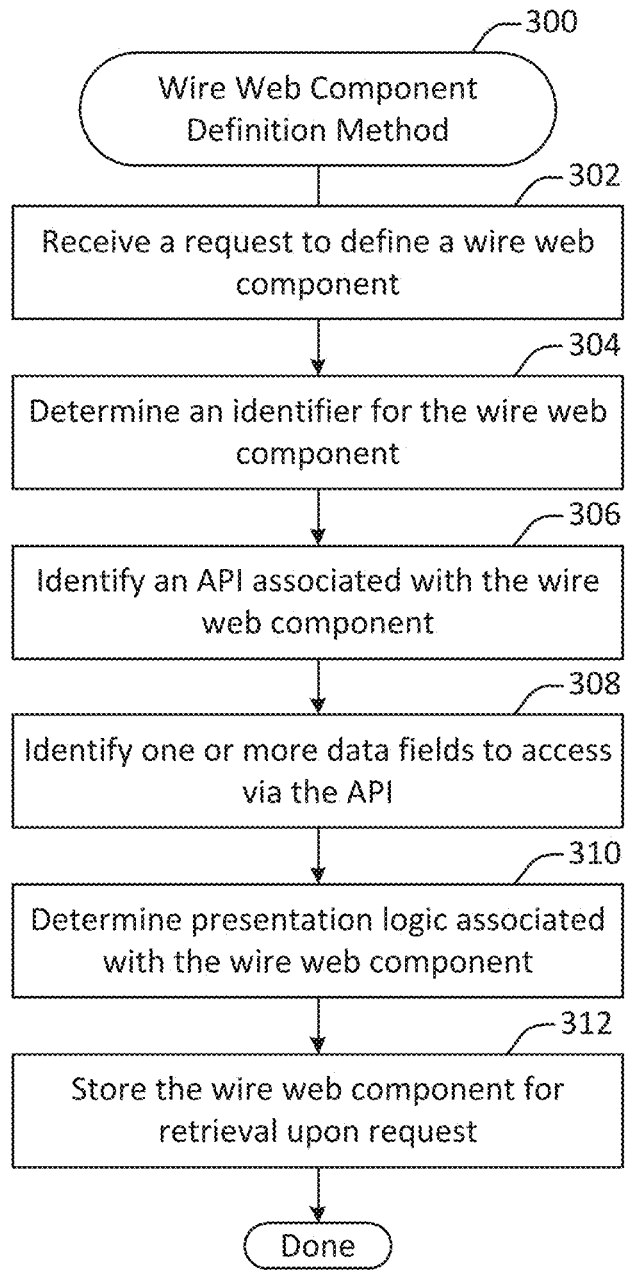
FIG. 3 illustrates an example of a method for defining a wire web component, performed in accordance with one or more embodiments.

In some implementations, the component construction module 274 may be configured to create a wire web component, as discussed with respect to the method 300 shown in FIG. 3. The event processing module 276 may be configured to update wire web components, as discussed with respect to the method 700 shown in FIG. 7. The component destruction module 278 may be configured to destroy a wire web component, as discussed with respect to the method 800 shown in FIG. 8. The data service 280 may be configured to manage communications between the wire web component processing engine 282 and one or more external data sources, such as the user APIs.

For the purpose of illustration, the client-server communication system 202 includes only a single client machine, a single server, and a limited number of components such as user APIs. However, in practice a system may include virtually any number of client machines, APIs, or other such components. In addition, components shown in FIG. 2 as residing on the server 202 may in fact be located on different physical machines and/or distributed across multiple physical machines.

FIG. 3 illustrates an example of a method 300 for defining a wire web component, performed in accordance with one or more embodiments. The method 300 may be used to define a new wire web component for providing to a client device that requests a user interface.

A request to define a wire web component is received at 302. According to various embodiments, the request may be received at a server in communication with a client machine. For example, the request may be received at the wire web component analysis engine 206 in communication with the client machine 252.

In some implementations, the request may be generated by a developer of a computing services client that accesses computing services via an on-demand computing services system associated with the server. Alternately, the request may be generated by a developer at the computing services system itself.

An identifier for the wire web component is determined at 304. According to various embodiments, the identifier may be determined based on user input. Alternately, or additionally, the system may automatically determine all or a portion of the identifier. The identifier may provide a mechanism by which to store and retrieve information associated with the wire web component. For instance, the identifier may be used within computing programming code to invoke the wire web component when an instance of a graphical user interface is created.

An API associated with the wire web component is identified at 306. In some implementations, the API may be determined based on user input. Alternately, or additionally, the system may automatically determine the API. The API may identify the end point for accessing information associated with the wire web component. For example, the API may be specified as an address such as a URI, IP address, or other such information. As another example, the API may be specified as an identifier that may subsequently be linked to an address for accessing information. For instance, the API may be specified as "Twitter", with the server maintaining a mapping from the API designator to the actual address used to access the API.

One or more data fields to access via the API are identified at 308. In some implementations, a data field may be used as a parameter when communicating with the API. For instance, when an instance of the wire web component is created, the client may transmit to the API information such as an object identifier and data field identifier in order to request to receive the data field value associated with the object identifier.

In particular embodiments, a wire web component may be associated with more than one API and/or set of data fields. For example, a wire web component may include some data fields accessed via an external social networking feed and other data fields accessed via an API associated with the server.

Presentation logic associated with the wire web component is determined at 310. According to various embodiments, the presentation logic may include computer programming code for combining, filtering, or otherwise processing raw data received via the API for presentation in a user interface. For example, one data field may be a phone number associated with a user account. Presentation logic may be used to format the phone number to include a link that will automatically dial the phone number. As another example, another data field may be timestamp that includes date and time information. Presentation logic may be used to extract and format the date information for presentation in a portion of the user interface where the time portion of the timestamp is not needed.

At 312, the wire web component is stored for retrieval upon request. According to various embodiments, the wire web component may be stored on a storage medium accessible via the wire web component analysis engine 206. For instance, the wire web component may be stored in the database system 204. The information that is stored may include any or all of the information identified in the method 300, as well as any other suitable information.

Figure 4:
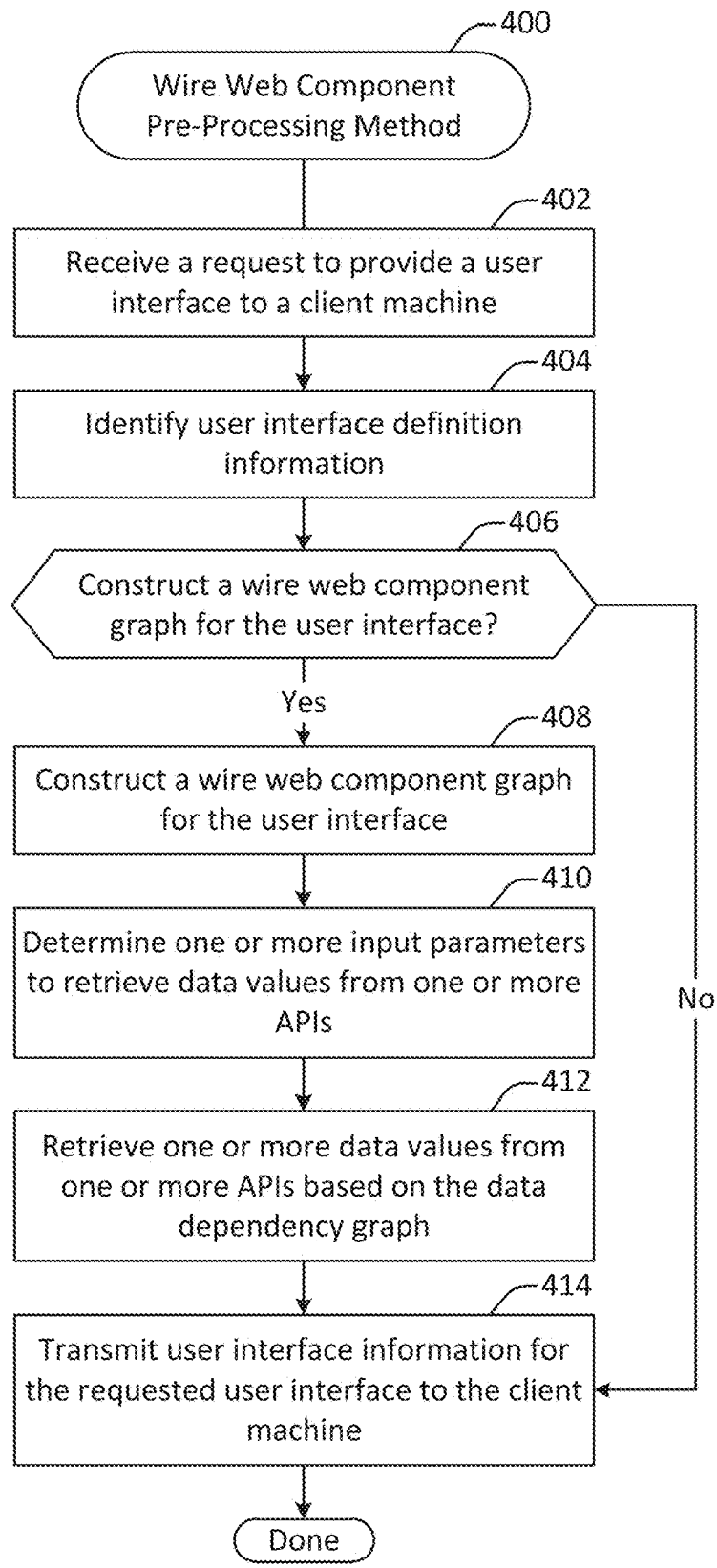
FIG. 4 illustrates an example of a method for preprocessing a wire web component, performed in accordance with one or more embodiments.

FIG. 4 illustrates an example of a method 400 for preprocessing a wire web component, performed in accordance with one or more embodiments. According to various embodiments, the method 400 may be performed at a server in communication with a client machine. For example, the method 400 may be performed at a server when a client machine transmits to the server a request to access a user interface.

A request to provide a user interface to a client machine is received at 402. The request may be transmitted from a processing engine such as the engine 282 within a web application instance such as the instance 272 shown in FIG. 2. The request may identify information such as the specific user interface to present. In addition, the request may provide contextual information such as one or more object identifiers, user identifiers, or other such information for identifying the information and/or other content to be included in the user interface.

User interface definition information is identified at 404. According to various embodiments, the user interface definition information may include one or more markup language files, wire web component definitions, or other such computer programming code included in the requested user interface. For example, the user interface request may include one or more identifiers such as URIs. The server may analyze these identifiers to identify computer programming code involved in responding to the user interface request and constructing the user interface.

A determination is made at 406 as to whether to construct a wire web component graph for the user interface. In particular embodiments, a wire web component graph need not be constructed at the server. For instance, the server may provide the user interface definition to the client machine without constructing a wire web component graph. The client machine may then construct the wire web component graph without further input from the server.

In some implementations, the determination made at 406 may be made at least in part based on the availability of computing resources at the server. For example, if the server has abundant resources available, then the wire web component graph may be at least partially constructed at the server. If instead the server has limited computing resources available, then the wire web component graph may not be constructed at the server. For example, a decision may be made to not construct the wire web component graph if the server is processing a large number of user interface requests or is otherwise occupied.

In some implementations, the determination made at 406 may be made at least in part based on the complexity of the user interface. For instance, if constructing the wire web component graph for the user interface is estimated to involve an excessive amount of time, then a determination may be made to not construct the graph at the server.

When it is determined that a wire web component graph for the user interface is to be constructed at the server, a wire web component graph for the user interface is constructed at 408. According to various embodiments, the wire web component graph is constructed at least in part based on the user interface definition information identified at 404. The wire web component graph may be constructed by analyzing the different wire web component definitions included in the user interface and then adding the components and their data fields to the graph.

In some embodiments, the server-side procedure for constructing the wire web component graph may overlap considerably with operations performed on the client machine. Additional details regarding the construction of a wire web component graph are discussed with respect to the method 500 shown in FIG. 5.

In some implementations, the wire web component graph constructed at 408 may be constructed at least in part by retrieving predetermined wire web component graph information. For example, a static graph portion may be constructed for a dynamic user interface and stored for retrieval upon request. Then, the wire web component graph for a particular request of the dynamic user interface may be constructed more quickly by starting with the retrieved static portion.

One or more input parameters to retrieve data values from one or more APIs are determined at 410. According to various embodiments, one or more input parameters may be determined based on analyzing the request received at 402. For example, the request may include one or more object identifiers or other API parameters for constructing the user interface.

In some implementations, one or more input parameters may be identified based on information associated with the source of the request. For example, the user interface may be requested from a client machine associated with a user account, and an identifier for that user account may then be selected as an input parameter to one or more APIs.

In some embodiments, one or more input parameters may be determined by applying a prediction model. The prediction model may be implemented based on one or more static or dynamic rules, one or more machine learning algorithms, and/or any other suitable prediction procedure. For instance, successive requests for user interfaces may be used to train a deep learning procedure to identify data likely to be requested by using as outcomes the data ultimately accessed in conjunction with each request.

In some embodiments, the prediction model may also be used to predict one or more portions of the wire web component graph. For example, the specific wire web components to include in a user interface may depend on dynamically determined values. Such values may be predicted and used as an input to identify one or more wire web components, data values, APIs, or other such portions of a wire web component graph.

At 412, one or more data values are retrieved from the one or more APIs based on the data dependency graph. According to various embodiments, the one or more data values may be retrieved by transmitting one or more of the input parameters determined at 410 to the appropriate API specified in the data dependency graph. In some configurations, the APIs queried in this way may be limited to those associated with the computing environment in which the server is situated, such as the APIs 208, 210, and 212. Alternately, or additionally, external APIs such as the APIs 220 and 222 shown in FIG. 2 may be queried.

User interface information for the requested user interface is transmitted to the client machine at 414. According to various embodiments, the transmitted information may include the user interface definition information identified at operation 404. When a wire web component graph is constructed at the server, then information associated with the wire web component graph may be transmitted as well. Such information may include some or all of the wire web component graph constructed at operation 408 and/or some or all of the data values retrieved at operation 412.

In particular embodiments, the wire web component graph may be only partially constructed at the server. For example, the server may attempt to predict input parameters such as data fields and/or data values but be unable to predict some such values with a reasonable degree of certainty. For instance, a data value may be dynamically determined at the client side. In such situations, the server may retrieve some data values for the user interface but not others, or may omit operation 412 entirely.

As another example, the server may limit the wire web component graph construction to static portions. For example, the server may construct a wire web component graph based on static wire web component definitions but not retrieve data values at 412 or include instances of the wire web components in the wire web component graph.

As yet another example, the server may trim a wire web component graph, for instance by identifying cut points in the graph and removing graph portions on either side of the cut points. In one such approach, the cut points may be determined based on a portion of the user interface predicted to be visible immediately or almost immediately to a user. Then, the portions likely to be viewed sooner may be retrieved, while the portions on the other side of the cut point that are likely to be viewed later or not at all may be removed. In this way, both the server-side processing time and the amount of information transmitted to the client machine may be reduced, thus decreasing the time that elapses between the request and the presentation of the user interface.

In particular embodiments, a partially constructed graph may be transmitted to the client machine and completed at the client machine. For example, the server may construct one or more static portions of a graph, and the client may complete one or more dynamic portions of a graph. As another example, the server may predict one or more parameters and retrieve one or more data values based on those predictions, and the client may determine the actual data values to ultimately present in the user interface. In such a situation, the client may in some instances receive data that it does not need, which can be discarded.

Figure 5:
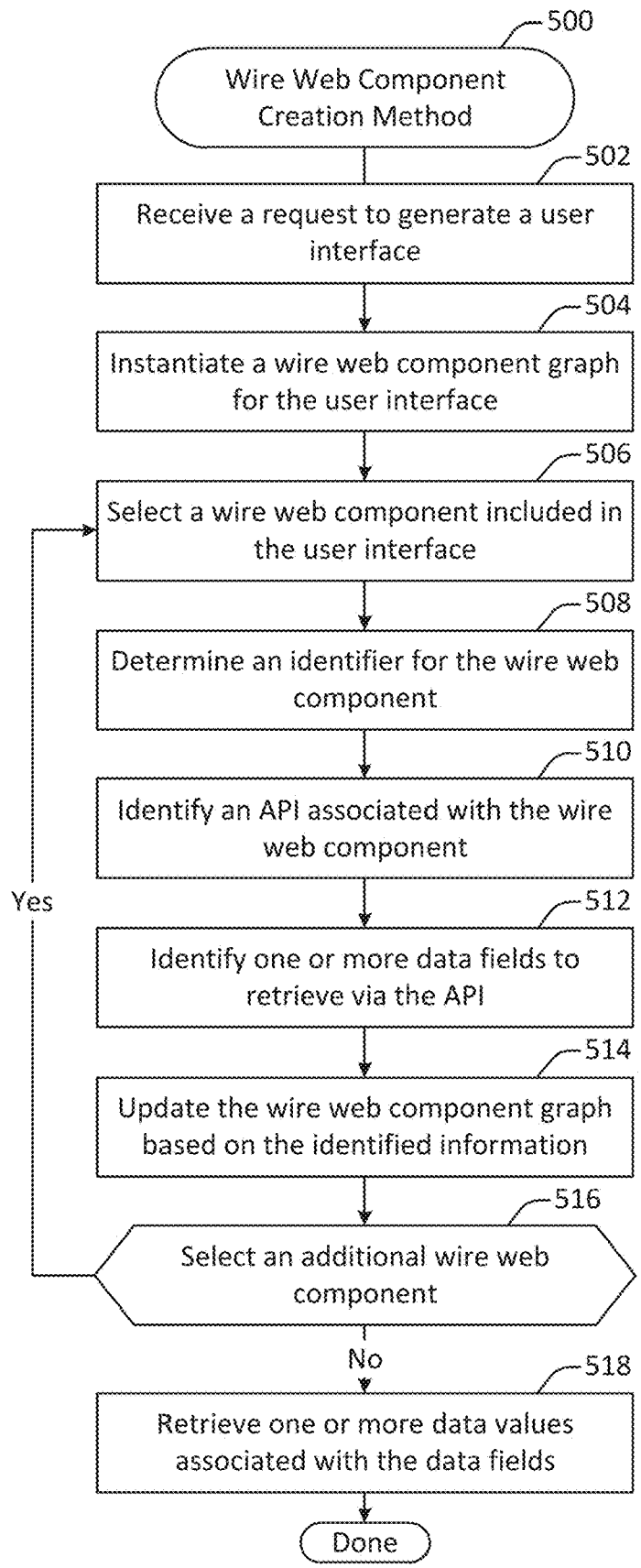
FIG. 5 illustrates an example of a method for creating a wire web component, performed in accordance with one or more embodiments.

According to various embodiments, one or more of the operations shown in FIG. 4 may be performed in an order different than that shown. For example, the construction of the wire web component graph at 408 may occur after the prediction of one or more input parameters at 410. Alternately, such operations may be interleaved and/or performed in parallel. For example, the prediction of input parameters may be performed as part of the process of constructing the wire web component graph, FIG. 5 illustrates an example of a method 500 for creating a wire web component, performed in accordance with one or more embodiments. According to various embodiments, the method 500 may be performed to generate a user interface that includes one or more wire web components at a client machine.

A request to generate a user interface is received at 502. According to various embodiments, the request may be received as part of the instantiation and/or operation of a web application. For example, a server may communicate with a client machine to provide a web application for accessing information via the server. The web application may be presented as a native application or via a web browser. The client and server may perform operations such as establishing a communications session, authenticating a user account, determining account permissions, and providing instructions for generating the user interface at the client machine.

A wire web component graph for the user interface is instantiated at 504. According to various embodiments, the wire web component graph represents relationships between one or more APIs, data values, and/or wire web components. Initially, the wire web component graph may be empty. Then, as wire web components are processed, the graph may be updated to include one or more relationships.

A wire web component included in the user interface is selected at 506. According to various embodiments, the wire web components may be selected in any suitable order, such as in order of appearance or at random. In particular embodiments, a wire web component may be selected for analysis when it is first instantiated in the user interface.

An identifier for the wire web component is determined at 508. An API associated with the wire web component is identified at 510. One or more data fields to retrieve via the API are identified at 512. According to various embodiments, such information may be identified or determined by accessing a wire web component definition constructed as discussed with respect to FIG. 3. The wire web component definition may be provided to the client machine by the server, for instance in response to the request to generate a user interface received at 502.

At 514, the wire web component graph is updated based on the identified information. According to various embodiments, updating the wire web component graph may involve adding to the graph any nodes that are not already present. For example, if the wire web component identifier determined at 508, the API identified at 510, or one or more of the data fields identified at 512 are not already present in the wire web component graph, then the missing identifiers may be added as nodes to the graph.

In some implementations, updating the wire web component graph may involve adding relationships between components. For example, if they are not already present, linkages may be added that connect the API identified at 510 to each of the one or more data fields identified at 512. As another example, if they are not already present, linkages may be added that connect the one or more data fields identified at 512 to the wire web component identifier determined at 508.

A determination is made at 516 as to whether to select an additional wire web component for analysis. As discussed with respect to operation 506, wire web components may be selected in any suitable order.

When no additional wire web components are available to instantiate, then at 518 one or more data values associated with the data fields are retrieved. In some implementations, the one or more data values may be retrieved by the data service 280 accessing the appropriate APIs via a network to retrieve the data values. Such communication may involve the data service providing information such as authentication data, object identifier information, data field identifier information, or any other suitable data in accordance with the respective API.

Figure 6:
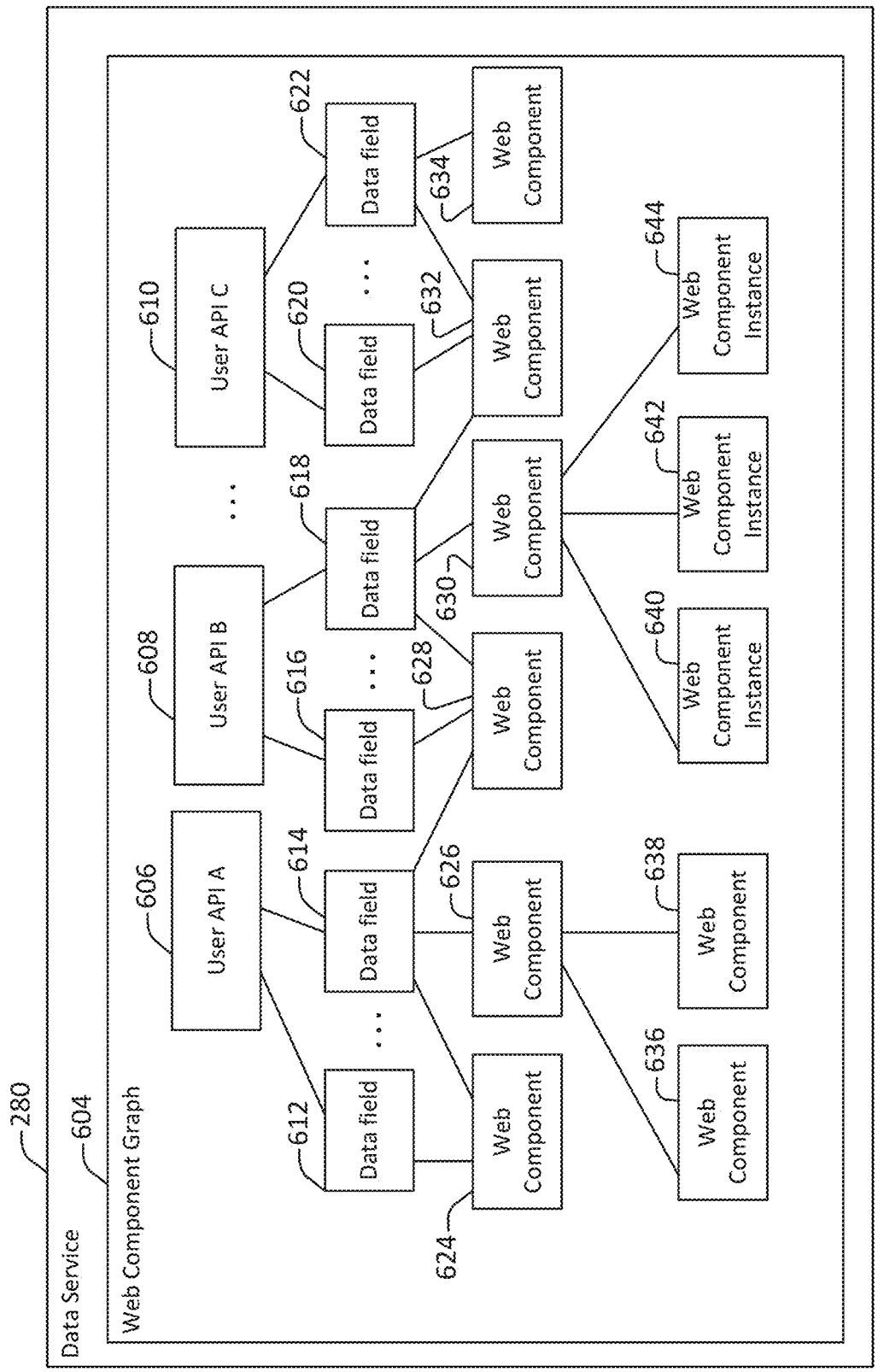
FIG. 6 illustrates an example of a data service, configured accordance with one or more embodiments.

In particular embodiments, the operations shown in FIG. 5 may be performed in an order different than that shown. For example, data values may be retrieved as the wire web component graph is constructed. For instance, operation 518 may be performed after operation 512. As another example, all or a portion of the wire web component creation method may be performed after the user interface is constructed, for instance if new wire web components are added to the constructed user interface, FIG. 6 illustrates an example of a data service 280, configured accordance with one or more embodiments. The data service includes a wire web component graph 604, constructed as discussed with respect to the methods 400 and/or 500. The wire web component graph 604 includes user APIs A 606, B 608, and C 610, data fields 612, 614, 616, 618, 620, and 622, and wire web components 624, 626, 628, 630, 632, and 634. The connections between the nodes represent dependency relationships.

In some embodiments, the wire web component graph 604 may be used to conduct operations related to updating data values. For example, the wire web component graph 604 may be used to identify a set of data fields that are retrieved from a single user API, even if those data fields are used by different wire web components. For instance, the data field 614 is used by the wire web components 624, 626, and 628, while the data field 612 is only used by the wire web component 624. However, both the data field 614 and the data field 612 are associated with the same user API, and retrieving both in the same API call may improve efficiency.

As another example, the data field 612 is only used by the wire web component 624. Accordingly, were the wire web component 624 to be disabled, then the data field 612 may no longer need to be updated.

In some implementations, as discussed with FIG. 4, all or a portion of the wire web component graph may be constructed as a static representation at the server. The static representation may then be used to pre-fetch data to transmit to the client machine for constructing the user interface.

According to various embodiments, as discussed with respect to FIG. 5, all or a portion of the wire web component graph may be constructed as a dynamic representation at the client machine. The client-side dynamic construction may use a static representation constructed at the server as an input. Alternately, the client-side dynamic construction may be created independently of or instead of a server-side static wire web component graph.

FIG. 6 illustrates an example of a data service 280, configured accordance with one or more embodiments. The data service 280 includes a wire web component graph 604. The wire web component graph 604 includes user APIs 606, 608, and 610, data fields 612, 614, 616, 618, 620, and 622 wire web components 624, 626 628, 630, 632, 634, 636, 638, and wire web component instances 640, 642, 644. According to various embodiments, the data service 280 may include one or more components not shown in FIG. 6, such as components for creating or editing the wire web component graph 604.

In some implementations, each user API is a network endpoint through which it is possible to access data. For instance, a user API may allow access to database objects, static or dynamic files, or information streams. In one example, a user API may facilitate access to a Twitter feed, a Salesforce Chatter feed, a Facebook feed. In another example, a user API may expose a query interface for accessing a database. In yet another example, a user API may provide access to a cloud storage repository such as AWS S3 or Google Cloud Storage.

In some embodiments, a user API may be provided in conjunction with the server through which the user interface is accessed. For example, the user interface may be provided based on an HTML request to a computing system that includes a web server, and that same computing system may include one or more APIs for accessing information.

In some embodiments, a user API may be provided in conjunction with a different server. For example, the user interface may be provided based on an HTML request to a computing system that includes a web server. However, one or more APIs used to access information to include in the user interface may be located externally to the computing system. For instance, the user interface may be provided by Salesforce.com, while the API may be a Twitter feed or a Facebook feed.

In some embodiments, a user API may be publicly accessible. For example, an API for accessing a public social media feed may not require authentication. For such an API, a request may need to specify only such information as the information sought to be retrieved.

In some embodiments, a user API may require authentication. For example, an API that exposes a database query interface may require authentication to ensure that the requesting account is authorized to access the requested information. Such authentication may be provided by a certificate, by a username and password combination, via a pre-established authenticated communication session, or through any other suitable mechanism.

According to various embodiments, each of the data fields identifies information that is retrievable via an API. For example, a data field may identify a database field, a database row, a file, data item from a social networking feed, or other such information.

In some implementations, retrieval of the data field may require additional contextual information. For example, a data field may identify a database column, which may refer to a defined value only when an object (i.e. row) identifier is provided as well. As another example, a data field for a social networking feed may identify information such as comment text, which may refer to a defined value only in conjunction with other information such as the specific comment from which the text is to be retrieved.

In particular embodiments, more than one copy of a data field may be present if one or more wire web components access the same data field for different contextual information. For example, a wire web component may retrieve a "name" field for five different "contact" objects. In this case, five copies of the "name" field may be included in the graph in association with different contextual information.

In particular embodiments, a single data field may include more than one copy of contextual or instance information. For example, a "name" field for a "contact" object may be associated with more than one object identifier so that the name field is accessed for each of the object identifiers.

According to various embodiments, each wire web component may correspond to a definition for a user interface portion configured in accordance with techniques and mechanisms described herein. Each wire web component may include information from one or more data fields, which may each be retrievable from a respective API. For example, the wire web component 632 includes the data fields 620 and 622, which are retrievable from the user API C 610, as well as the data field 618, which is retrievable from the user API B 608.

In some implementations, different wire web components may include the same data field. For example, the wire web components 632, 630, and 628 each include the data field 618, which is accessible via the user API B 608. By constructing the wire web component graph, such overlapping data access may be revealed and used to consolidate queries to improve efficiency. For instance, rather than the data field 618 being requested separately for each of the wire web components 632, 630, and 628, a single request may be made, with the results accessible by each of the wire web components 632, 630, and 628. In this way, the number of API requests and the amount of network traffic may potentially be significantly reduced.

In some implementations, a wire web component may include other wire web components. For example, the parent wire web component 626 includes the child wire web components 636 and 638. Child wire web components may in turn include other child wire web components.

According to various embodiments, a wire web component graph may include one or more instances of a wire web component definition. For example, the wire web component instances 640, 642, and 644 are instances of the wire web component definition 630. Such instances may identify contextual information for retrieving data fields. For example, each of the wire web component instances 640, 642, and 644 may correspond to different instances of a wire web component for displaying a user account object. In particular embodiments, a static wire web component may be generated during static analysis, with multiple dynamic instances of the static wire web component generated at run-time.

In some embodiments, a wire web component graph may be incomplete or only partially constructed. For example, the server may partially construct a wire web component graph for a user interface request and send the partially constructed graph to the client machine. The client machine may then continue to construct the wire web component graph based on additional information at the client machine.

The wire web component graph 604 shown in FIG. 6 is presented for illustrative purposes only. In practice, the components, fields, and APIs included in a wire web component graph depend on the specific user interface being constructed. Accordingly, a wire web component graph constructed for an actual user interface may include potentially many more APIs, data fields, wire web components, and/or wire web component instances than are shown in FIG. 6.

Figure 7:
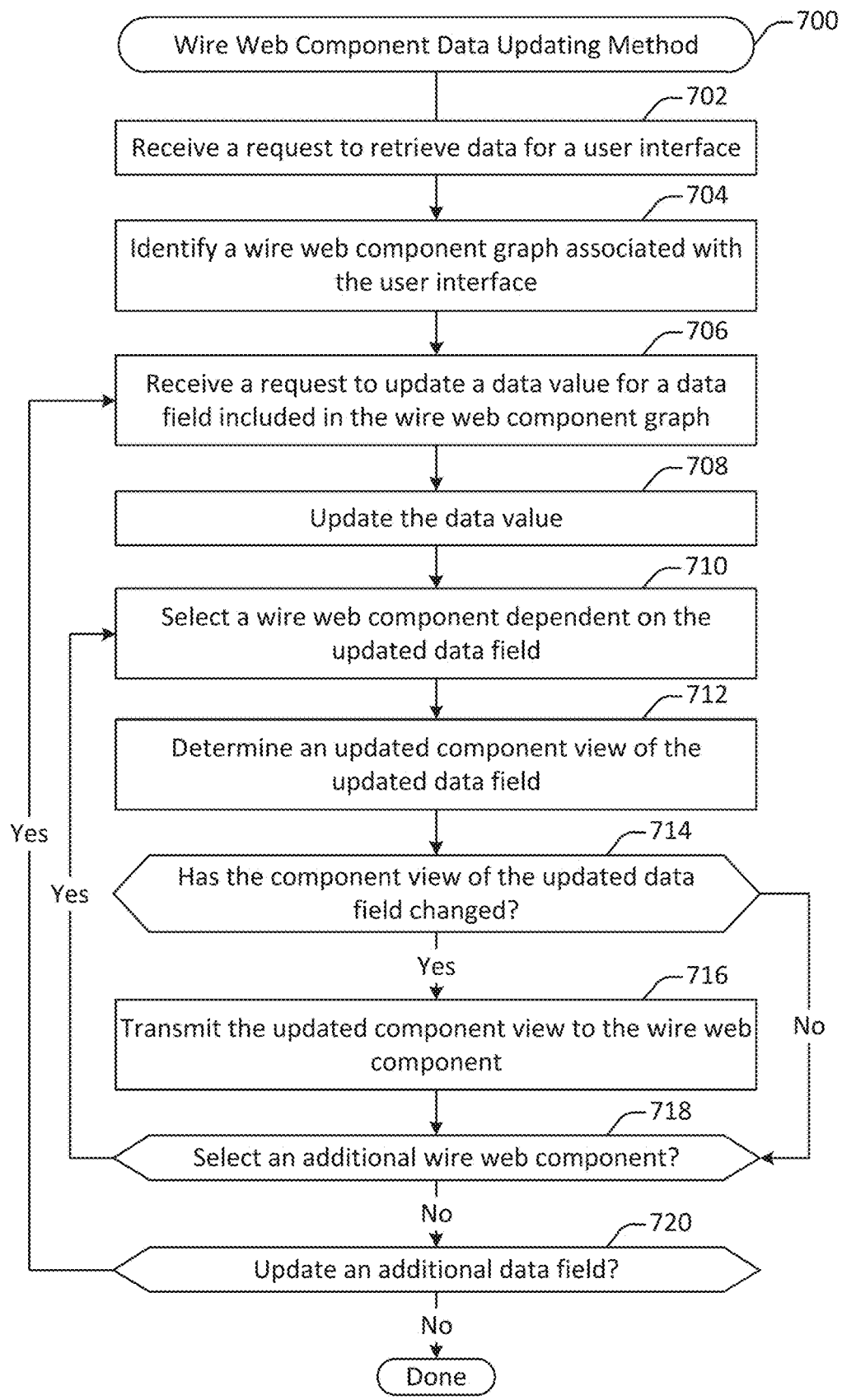
FIG. 7 illustrates an example of a method for updating wire web component data, performed accordance with one or more embodiments.

FIG. 7 illustrates an example of a method 700 for updating wire web component data, performed accordance with one or more embodiments. The method 700 may be performed after a user interface having one or more wire web components is created as discussed with respect to FIG. 5. While a user interface is active, the data represented in the user interface may change. For example, a user may provide user input via the user interface that changes a data value at one or more locations in the user interface. As another example, the data may change on the server. As yet another example, an action or event may trigger a request to query the server to determine if updated information is available.

A request to retrieve data for a user interface is received at 702. According to various embodiments, the request may be received when the user interface is initiated, or at a later point in time. For example, the request may be triggered based on an event or user action. As another example, the method 700 may run continuously for an active user interface. As yet another example, the method 700 may run whenever a user interface is made active. For instance, a user may access different user interfaces via different browser tabs. The method 700 may then be initiated when the user selects the browser tab in which the relevant user interface is located.

A wire web component graph associated with the user interface is identified at 704. According to various embodiments, the wire web component graph may be created as discussed with respect to the method 500 shown in FIG. 5. Such a graph may specify the relationships between APIs, data values, and wire web components. An example of such a graph is shown in FIG. 6. The client machine may maintain the graph, even as one or more wire web components are deactivated, as discussed with respect to FIG. 8.

A request to update a data value for a data field included in the wire web component graph is received at 706. According to various embodiments, the request may be generated in any of a variety of ways. For example, a portion of the user interface in which the data value is presented may be updated to include a new data value, for instance via user input. As another example, the server may transmit a message indicating that the data value has been updated on the server. As yet another example, a user may provide user input indicating or triggering a request to update a data value. As still another example, a runtime context may provide a signal. For example, the loading of designated data values into a web browser user interface may trigger a request to update a different data field.

The data value is updated at 708. According to various embodiments, updating the data value may involve accessing the appropriate API and providing information such as authentication data, an object instance identifier, and a data field identifier. The updated data value may then be received from the API via a communications interface, and the wire web component updated in memory to include the updated data value.

In some implementations, updating the data value may involve retrieving data from a different location at the client machine. For example, a user interface may present two different views side-by-side. In this example, a data value may indicate a page number associated with the other view. As another example, different component views of a data value may be displayed at different places in the user interface. When one of these component views are changed (e.g., via user input), the data value associated with the component view may be updated.

An updated component view of the updated data field is determined at 712. According to various embodiments, a component view may display a filtered and/or modified view of the underlying data value. For example, a component view of an address may add a link to the address in a mapping application. The updated component view may be determined by applying the data field component logic associated with the wire web component dependent on the updated data field.

A determination is made at 714 as to whether the component view of the updated data field changed. According to various embodiments, the determination may be made by analyzing and/or executing the logic associated with the component view. As discussed herein, a component view may display a filtered and/or modified view of the underlying data value. For example, a component view of a name may display only the initials rather than the full first and last name. In this example, the component view would not change if the name were updated to correct a misspelling but the initials were unaltered. As another example, a timestamp may be modified to include only the day and hour components rather than the year, day, hour, minute, and second components. In this example, even if the timestamp changes to a different value, the component view of the timestamp would not change so long as the day and hour for the new timestamp were the same as the day and hour for the previous timestamp.

The updated component view is transmitted to the wire web component at 716. According to various embodiments, transmitting the updated component view to the wire web component may involve any suitable operations for updating the user interface. For example, an updated component view data value may be updated in memory so that the wire web component can access the data value. As another example, one or more elements of a DOM tree may be modified to include the updated component view.

According to various embodiments, the Document Object Model (DOM) is a cross-platform and language-independent application programming interface that treats an HTML, XHTML, or XML document as a tree structure wherein each node is an object representing a part of the document. The DOM represents a document with a logical tree. A branch of the tree ends in a node, and a node may contain objects. DOM methods allow programmatic access to the tree. For example, a DOM method may allow changing the structure, style, and/or content of a document.

A determination is made at 718 as to whether to select an additional wire web component for analysis. As discussed with respect to operation 710, wire web components may be selected in any suitable order, such as in sequence, at random, or in parallel.

A determination is made at 720 as to whether to select an additional data field for updating. As discussed with respect to operations 702 and 706, the method 700 may be run continuously to support on-demand and/or periodic updating of any of the data values associated with one or more wired wire web components in the user interface.

According to various embodiments, one or more of the operations shown in FIG. 7 may be performed in an order different than that shown. For example, multiple data values associated with a single wire web component may be updated at the same time. In such a configuration, a wire web component may be updated as a unit rather than separately updating individual data values associated with the wire web component.

Figure 8:
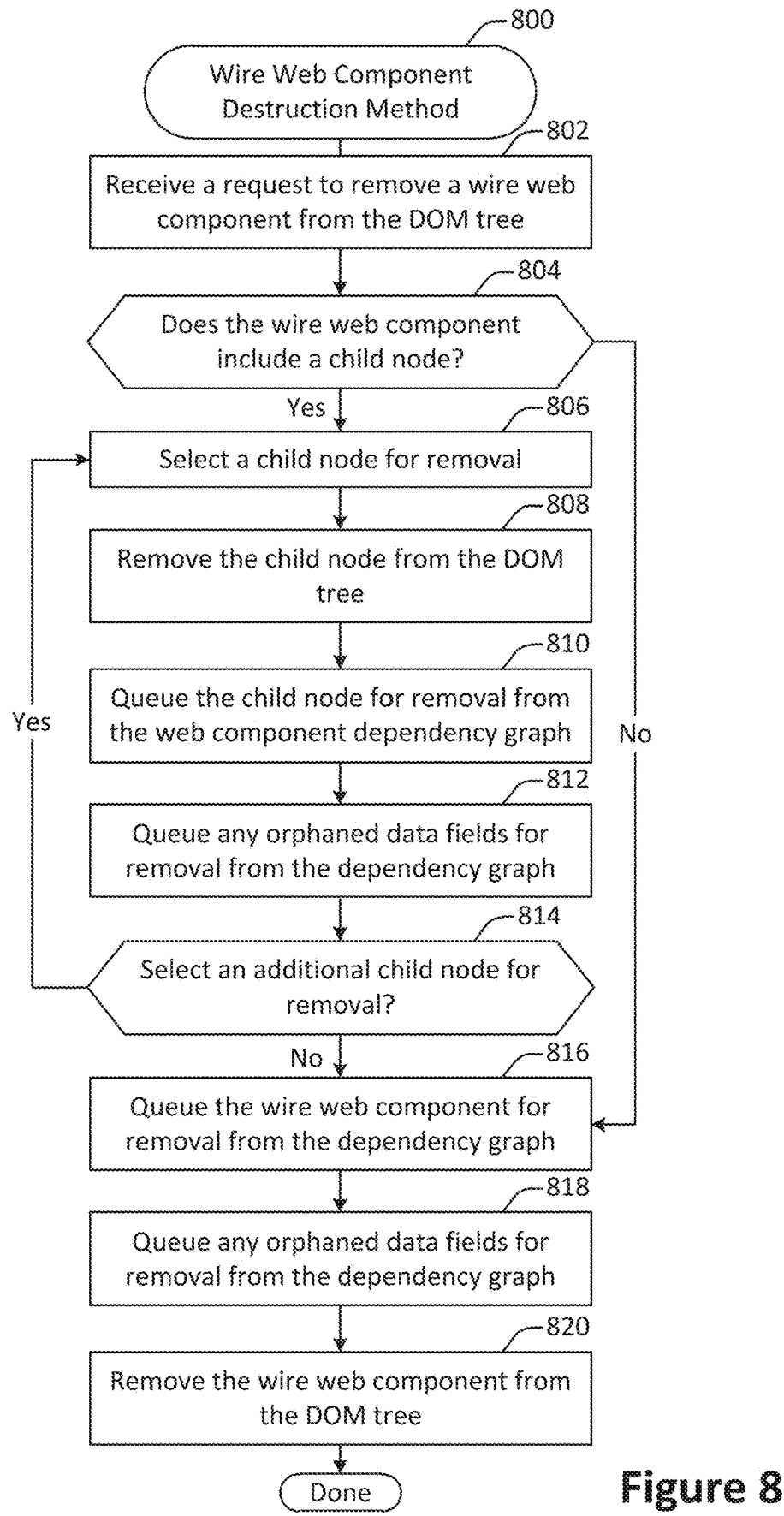
FIG. 8 illustrates an example of a method for destroying a wire web component, performed accordance with one or more embodiments.

FIG. 8 illustrates an example of a method 800 for destroying a wire web component, performed accordance with one or more embodiments. According to various embodiments, the method 800 may be performed at wire web component processing engine at a client machine such as the wire web component processing engine 282 shown in FIG. 2.

A request is received at 802 to remove a wire web component from the DOM tree. Such a request may be generated based on an action performed with respect to the user interface. for example, a user may close a user interface portion that includes the wire web component. As another example, a user may navigate from one tab within a user interface to a different tab within the user interface, causing the first tab to become hidden. As yet another example, the user interface may scroll so that the wire web component is no longer visible.

A determination is made at 804 as to whether the wire web component includes a child node. According to various embodiments, the DOM tree is a hierarchical structure in which code representing a user interface portion can itself include child portions that include child node code representing other user interface portions. Accordingly, the determination at 804 may be made at least in part by analyzing the DOM tree to identify any such child nodes.

When it is determined that the wire web component includes a child node, one of the child nodes may be selected for removal at operation 806. According to various embodiments, the child nodes may be selected in any suitable order. For example, child nodes may be selected for removal in sequence, in parallel, or at random. In some implementations, child nodes may be selected at least in part via a recursive process. For instance, each child node of the wire web component may be selected for removal in some order, with each descendent of that child node being recursively processed as part of the removal of the child node.

The child node is removed from the DOM tree at 808. According to various embodiments, the child node may be removed by calling a DOM tree removal function for editing the DOM tree.

At 810, the child node is queued for removal from the wire web component dependency graph. At 812, any orphaned data field nodes are queued for removal from the wire web component dependency graph. According to various embodiments, an orphaned data field node is a data field in the wire web component dependency graph that is no longer connected to any wire web components that are not themselves queued for removal.

In some implementations, the wire web component processing engine 282 may maintain a queue of nodes that have been flagged for removal. Alternately, or additionally, the nodes may be flagged for removal in the wire web component graph. When a node is queued for removal, the node may be removed at a time strategically determined based on considerations such as computing resource availability, bandwidth considerations, and/or one or more data access thresholds.

In some embodiments, a node that is queued for removal from the wire web component dependency graph may be removed immediately. For example, the user interface may be loaded on a mobile computing device or other device having relatively limited computing power and/or bandwidth. As another example, the user interface may have relatively high computing resource and/or bandwidth requirements due to the complexity of the interface and/or the type or amount of data accessed. In such situations, removing the node immediately may help to alleviate resource and/or bandwidth constraints.

In some embodiments, a node that is queued for removal from the wire web component dependency graph may ultimately not be removed. For example, the user interface may be destroyed before removal occurs. As another example, the node may subsequently be added back to the DOM tree. For instance, the user may provide user input that re-activates the wire web component.

Alternately, a node queued for removal may be removed at a later point in time. For example, the wire web component processing engine may periodically evaluate considerations such as the use and/or availability of computing resources and/or bandwidth. When bandwidth and/or computing resource usage exceeds a designated threshold, then the wire web component processing engine may remove a node from the wire web component dependency graph. For instance, nodes may be removed in the order of "first in, first out."

As another example, the wire web component processing engine may keep nodes queued for removal for a designated period of time, such as 1 minute, 5 minutes, or 10 minutes. If the node has not been re-added within the designated period of time, then the node may be removed from the wire web component dependency graph.

In particular embodiments, queuing the node for removal at 810 may provide for a balance between user interface responsiveness and resource usage. On one hand, removing a node from the wire web component dependency graph sooner (or immediately) may help to reduce bandwidth and/or computing resource usage by avoiding the cost of updating the data associated with the node. On the other hand, removing a node from the wire web component dependency graph sooner (or immediately) may help to improve user interface responsiveness by providing faster access to the data associated with the node if the associated wire web component is later re-added to the DOM tree. That is, if the wire web component is later re-added to the DOM tree, the data for that component would already be available and would not need to be fetched if the node associated with the wire web component has not yet been removed from the wire web component dependency graph. Given that the likelihood that a component is added to the DOM tree is higher for a recently-removed wire web component, queueing components for removal in this way can provide faster access to the data in the average case.

A determination is made at 814 as to whether to select an additional child node for removal. As discussed with respect to operation 806, nodes may be selected for removal in any suitable order.

At 816, the wire web component is queued for removal for the dependency graph. At 818, any orphaned data fields are queued for removal from the dependency graph. At 820, the wire web component is removed from the DOM tree. According to various embodiments, the operations 816-820 may be performed in a manner substantially similar to the operations 808-812.

In particular embodiments, the operations shown in FIG. 8 may be performed in an order different than that shown. For example, in a recursive procedure, each descendent of a node may be processed prior to processing the node itself. For example, in FIG. 6, removing the wire web component 630 may involve first removal the wire web component instances 640, 642, and 644, as well as any children of each of those nodes.

Figure 9:
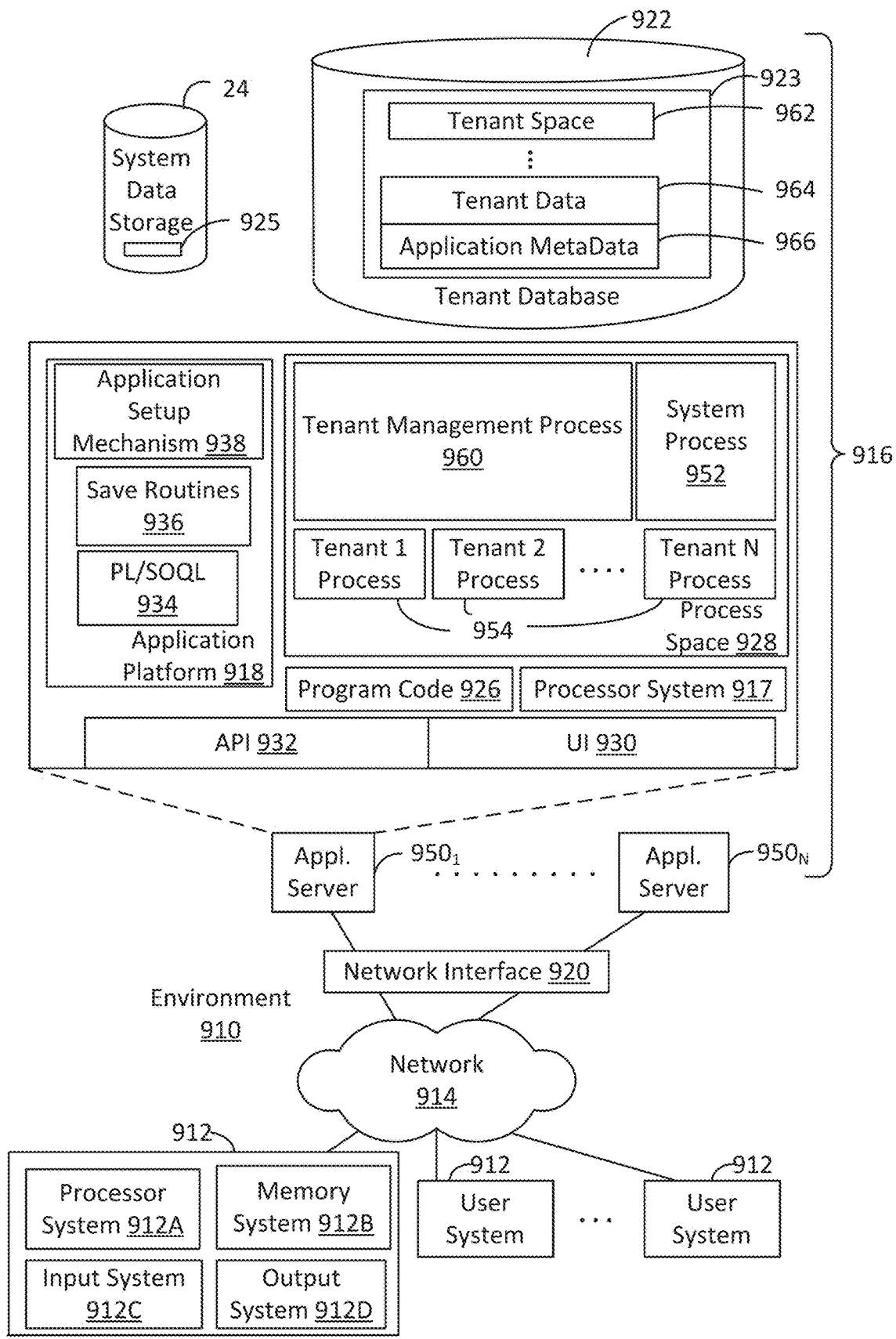
FIG. 9 shows a block diagram of an example of an environment that includes an on-demand database service configured in accordance with some implementations.

FIG. 9 shows a block diagram of an example of an environment 910 that includes an on-demand database service configured in accordance with some implementations. Environment 910 may include user systems 912, network 914, database system 916, processor system 917, application platform 918, network interface 920, tenant data storage 922, tenant data 923, system data storage 924, system data 925, program code 926, process space 928, User Interface (UI) 930, Application Program Interface (API) 932, PL/SOQL 934, save routines 936, application setup mechanism 938, application servers 950-1 through 950-N, system process space 952, tenant process spaces 954, tenant management process space 960, tenant storage space 962, user storage 964, and application metadata 966. Some of such devices may be implemented using hardware or a combination of hardware and software and may be implemented on the same physical device or on different devices. Thus, terms such as "data processing apparatus," "machine," "server" and "device" as used herein are not limited to a single hardware device, but rather include any hardware and software configured to provide the described functionality.

An on-demand database service, implemented using system 916, may be managed by a database service provider. Some services may store information from one or more tenants into tables of a common database image to form a multi-tenant database system (MTS). As used herein, each MTS could include one or more logically and/or physically connected servers distributed locally or across one or more geographic locations. Databases described herein may be implemented as single databases, distributed databases, collections of distributed databases, or any other suitable database system. A database image may include one or more database objects. A relational database management system (RDBMS) or a similar system may execute storage and retrieval of information against these objects.

In some implementations, the application platform 18 may be a framework that allows the creation, management, and execution of applications in system 916. Such applications may be developed by the database service provider or by users or third-party application developers accessing the service. Application platform 918 includes an application setup mechanism 938 that supports application developers' creation and management of applications, which may be saved as metadata into tenant data storage 922 by save routines 936 for execution by subscribers as one or more tenant process spaces 954 managed by tenant management process 960 for example. Invocations to such applications may be coded using PL/SOQL 934 that provides a programming language style interface extension to API 932. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes. Such system processes may manage retrieval of application metadata 966 for a subscriber making such an invocation. Such system processes may also manage execution of application metadata 966 as an application in a virtual machine.

In some implementations, each application server 950 may handle requests for any user associated with any organization. A load balancing function (e.g., an F5 Big-IP load balancer) may distribute requests to the application servers 950 based on an algorithm such as least-connections, round robin, observed response time, etc. Each application server 950 may be configured to communicate with tenant data storage 922 and the tenant data 923 therein, and system data storage 924 and the system data 925 therein to serve requests of user systems 912. The tenant data 923 may be divided into individual tenant storage spaces 962, which can be either a physical arrangement and/or a logical arrangement of data. Within each tenant storage space 962, user storage 964 and application metadata 966 may be similarly allocated for each user. For example, a copy of a user's most recently used (MRU) items might be stored to user storage 964. Similarly, a copy of MRU items for an entire tenant organization may be stored to tenant storage space 962. A UI 930 provides a user interface and an API 932 provides an application programming interface to system 916 resident processes to users and/or developers at user systems 912.

System 916 may implement a web-based user interface client-server system. For example, in some implementations, system 916 may include application servers configured to implement and execute service-side database access user-interface software applications. The application servers may be configured to provide related data, code, forms, web pages and other information to and from user systems 912. Additionally, the application servers may be configured to store information to, and retrieve information from a database system. Such information may include related data, objects, and/or Webpage content. With a multi-tenant system, data for multiple tenants may be stored in the same physical database object in tenant data storage 922, however, tenant data may be arranged in the storage medium(s) of tenant data storage 922 so that data of one tenant is kept logically separate from that of other tenants. In such a scheme, one tenant may not access another tenant's data, unless such data is expressly shared.

Several elements in the system shown in FIG. 9 include conventional, well-known elements that are explained only briefly here. For example, user system 912 may include processor system 912A, memory system 912B, input system 912C, and output system 9 12D. A user system 912 may be implemented as any computing device(s) or other data processing apparatus such as a mobile phone, laptop computer, tablet, desktop computer, or network of computing devices. User system 12 may run an internet browser allowing a user (e.g., a subscriber of an MTS) of user system 912 to access, process and view information, pages and applications available from system 916 over network 914. Network 914 may be any network or combination of networks of devices that communicate with one another, such as any one or any combination of a LAN (local area network), WAN (wide area network), wireless network, or other appropriate configuration.

The users of user systems 912 may differ in their respective capacities, and the capacity of a particular user system 912 to access information may be determined at least in part by "permissions" of the particular user system 912. As discussed herein, permissions generally govern access to computing resources such as data objects, components, and other entities of a computing system, such as a social networking system, and/or a CRM database system. "Permission sets" generally refer to groups of permissions that may be assigned to users of such a computing environment. For instance, the assignments of users and permission sets may be stored in one or more databases of System 916. Thus, users may receive permission to access certain resources. A permission server in an on-demand database service environment can store criteria data regarding the types of users and permission sets to assign to each other.

For example, a computing device can provide to the server data indicating an attribute of a user (e.g., geographic location, industry, role, level of experience, etc.) and particular permissions to be assigned to the users fitting the attributes. Permission sets meeting the criteria may be selected and assigned to the users. Moreover, permissions may appear in multiple permission sets. In this way, the users can gain access to the components of a system.

In some an on-demand database service environments, an Application Programming Interface (API) may be configured to expose a collection of permissions and their assignments to users through appropriate network-based services and architectures, for instance, using Simple Object Access Protocol (SOAP) Web Service and Representational State Transfer (REST) APIs.

In some implementations, a permission set may be presented to an administrator as a container of permissions. However, each permission in such a permission set may reside in a separate API object exposed in a shared API that has a child-parent relationship with the same permission set object. This allows a given permission set to scale to millions of permissions for a user while allowing a developer to take advantage of joins across the API objects to query, insert, update, and delete any permission across the millions of possible choices. This makes the API highly scalable, reliable, and efficient for developers to use.

In some implementations, a permission set API constructed using the techniques disclosed herein can provide scalable, reliable, and efficient mechanisms for a developer to create tools that manage a user's permissions across various sets of access controls and across types of users. Administrators who use this tooling can effectively reduce their time managing a user's rights, integrate with external systems, and report on rights for auditing and troubleshooting purposes. By way of example, different users may have different capabilities with regard to accessing and modifying application and database information, depending on a user's security or permission level, also called authorization. In systems with a hierarchical role model, users at one permission level may have access to applications, data, and database information accessible by a lower permission level user, but may not have access to certain applications, database information, and data accessible by a user at a higher permission level.

As discussed above, system 916 may provide on-demand database service to user systems 912 using an MTS arrangement. By way of example, one tenant organization may be a company that employs a sales force where each salesperson uses system 916 to manage their sales process. Thus, a user in such an organization may maintain contact data, leads data, customer follow-up data, performance data, goals and progress data, etc., all applicable to that user's personal sales process (e.g., in tenant data storage 922). In this arrangement, a user may manage his or her sales efforts and cycles from a variety of devices, since relevant data and applications to interact with (e.g., access, view, modify, report, transmit, calculate, etc.) such data may be maintained and accessed by any user system 912 having network access.

When implemented in an MTS arrangement, system 916 may separate and share data between users and at the organization-level in a variety of manners. For example, for certain types of data each user's data might be separate from other users' data regardless of the organization employing such users. Other data may be organization-wide data, which is shared or accessible by several users or potentially all users form a given tenant organization. Thus, some data structures managed by system 916 may be allocated at the tenant level while other data structures might be managed at the user level. Because an MTS might support multiple tenants including possible competitors, the MTS may have security protocols that keep data, applications, and application use separate. In addition to user-specific data and tenant-specific data, system 916 may also maintain system-level data usable by multiple tenants or other data. Such system-level data may include industry reports, news, postings, and the like that are sharable between tenant organizations.

In some implementations, user systems 912 may be client systems communicating with application servers 950 to request and update system-level and tenant-level data from system 916. By way of example, user systems 912 may send one or more queries requesting data of a database maintained in tenant data storage 922 and/or system data storage 924. An application server 950 of system 916 may automatically generate one or more SQL statements (e.g., one or more SQL queries) that are designed to access the requested data. System data storage 924 may generate query plans to access the requested data from the database.

The database systems described herein may be used for a variety of database applications. By way of example, each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some implementations, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in an MTS. In certain implementations, for example, all custom entity data rows may be stored in a single multi-tenant physical table, which may contain multiple logical tables per organization. It may be transparent to customers that their multiple "tables" are in fact stored in one large table or that their data may be stored in the same table as the data of other customers.

Figure 10A:
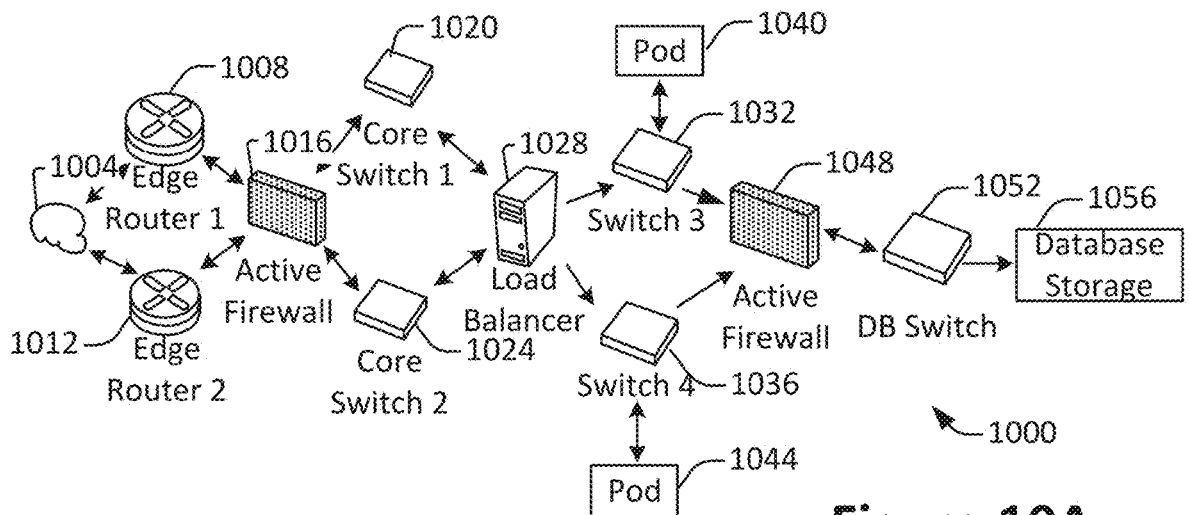
FIG. 10A shows a system diagram of an example of architectural components of an on-demand database service environment, configured in accordance with some implementations.

FIG. 10A shows a system diagram of an example of architectural components of an on-demand database service environment 1000, configured in accordance with some implementations. A client machine located in the cloud 1004 may communicate with the on-demand database service environment via one or more edge routers 1008 and 1012. A client machine may include any of the examples of user systems ?12 described above. The edge routers 1008 and 1012 may communicate with one or more core switches 1020 and 1024 via firewall 1016. The core switches may communicate with a load balancer 1028, which may distribute server load over different pods, such as the pods 1040 and 1044 by communication via pod switches 1032 and 1036. The pods 1040 and 1044, which may each include one or more servers and/or other computing resources, may perform data processing and other operations used to provide on-demand services. Components of the environment may communicate with a database storage 1056 via a database firewall 1048 and a database switch 1052.

Accessing an on-demand database service environment may involve communications transmitted among a variety of different components. The environment 1000 is a simplified representation of an actual on-demand database service environment. For example, some implementations of an on-demand database service environment may include anywhere from one to many devices of each type. Additionally, an on-demand database service environment need not include each device shown, or may include additional devices not shown, in FIGS. 10A and 10B.

The cloud 1004 refers to any suitable data network or combination of data networks, which may include the Internet. Client machines located in the cloud 1004 may communicate with the on-demand database service environment 1000 to access services provided by the on-demand database service environment 1000. By way of example, client machines may access the on-demand database service environment 1000 to retrieve, store, edit, and/or process wire web component information.

In some implementations, the edge routers 1008 and 1012 route packets between the cloud 1004 and other components of the on-demand database service environment 1000. The edge routers 1008 and 1012 may employ the Border Gateway Protocol (BGP). The edge routers 1008 and 1012 may maintain a table of IP networks or 'prefixes', which designate network reachability among autonomous systems on the Internet.

In one or more implementations, the firewall 1016 may protect the inner components of the environment 1000 from Internet traffic. The firewall 1016 may block, permit, or deny access to the inner components of the on-demand database service environment 1000 based upon a set of rules and/or other criteria. The firewall 1016 may act as one or more of a packet filter, an application gateway, a stateful filter, a proxy server, or any other type of firewall.

In some implementations, the core switches 1020 and 1024 may be high-capacity switches that transfer packets within the environment 1000. The core switches 1020 and 1024 may be configured as network bridges that quickly route data between different components within the on-demand database service environment. The use of two or more core switches 1020 and 1024 may provide redundancy and/or reduced latency.

In some implementations, communication between the pods 1040 and 1044 may be conducted via the pod switches 1032 and 1036. The pod switches 1032 and 1036 may facilitate communication between the pods 1040 and 1044 and client machines, for example via core switches 1020 and 1024. Also or alternatively, the pod switches 1032 and 1036 may facilitate communication between the pods 1040 and 1044 and the database storage 1056. The load balancer 1028 may distribute workload between the pods, which may assist in improving the use of resources, increasing throughput, reducing response times, and/or reducing overhead. The load balancer 1028 may include multilayer switches to analyze and forward traffic.

In some implementations, access to the database storage 1056 may be guarded by a database firewall 1048, which may act as a computer application firewall operating at the database application layer of a protocol stack. The database firewall 1048 may protect the database storage 1056 from application attacks such as structure query language (SQL) injection, database rootkits, and unauthorized information disclosure. The database firewall 1048 may include a host using one or more forms of reverse proxy services to proxy traffic before passing it to a gateway router and/or may inspect the contents of database traffic and block certain content or database requests. The database firewall 1048 may work on the SQL application level atop the TCP/IP stack, managing applications' connection to the database or SQL management interfaces as well as intercepting and enforcing packets traveling to or from a database network or application interface.

In some implementations, the database storage 1056 may be an on-demand database system shared by many different organizations. The on-demand database service may employ a single-tenant approach, a multi-tenant approach, a virtualized approach, or any other type of database approach. Communication with the database storage 1056 may be conducted via the database switch 1052. The database storage 1056 may include various software components for handling database queries. Accordingly, the database switch 1052 may direct database queries transmitted by other components of the environment (e.g., the pods 1040 and 1044) to the correct components within the database storage 1056.

Figure 10B:
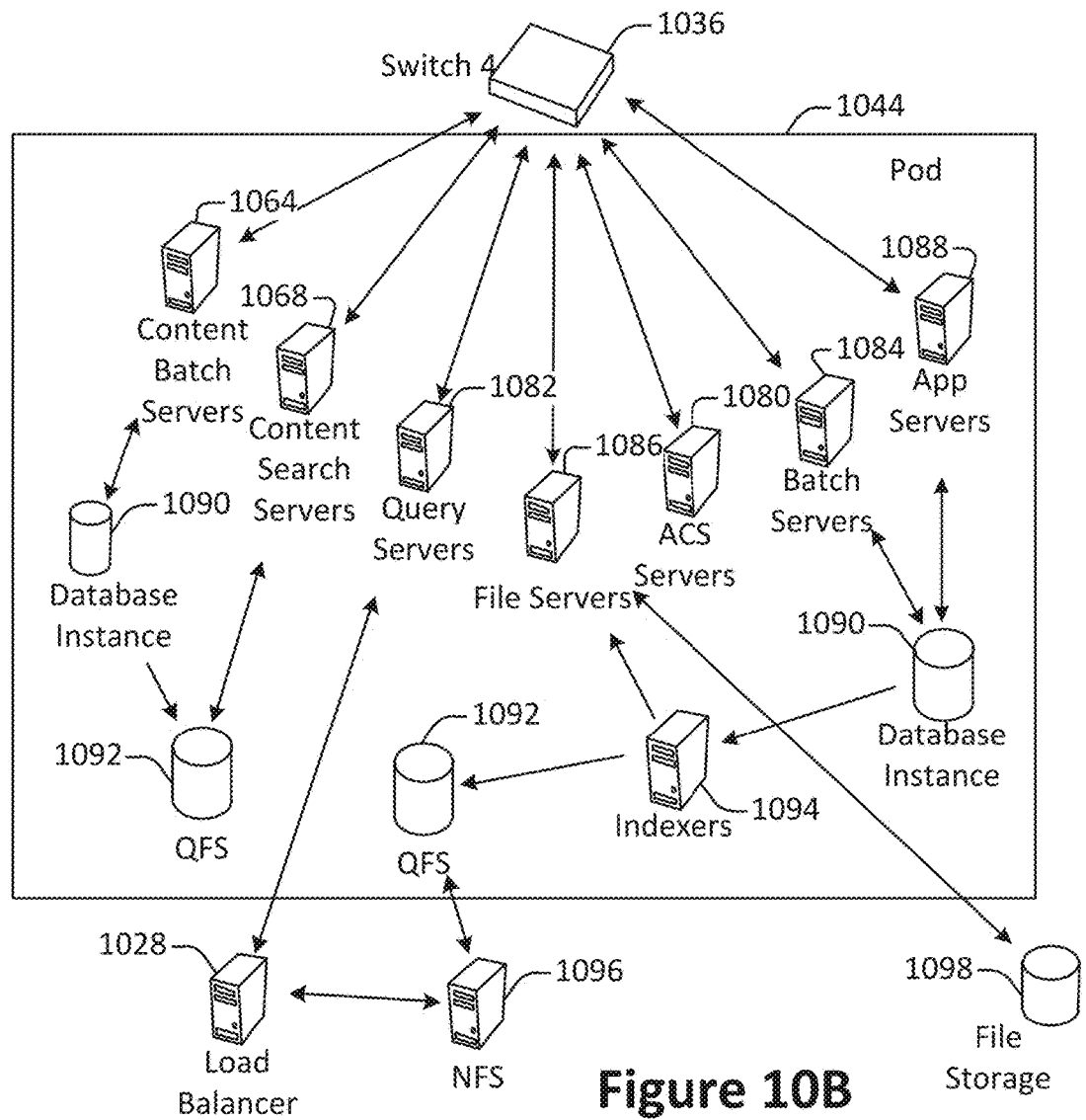
FIG. 10B shows a system diagram further illustrating an example of architectural components of an on-demand database service environment, in accordance with some implementations.

FIG. 10B shows a system diagram further illustrating an example of architectural components of an on-demand database service environment, in accordance with some implementations. The pod 1044 may be used to render services to user(s) of the on-demand database service environment 1000. The pod 1044 may include one or more content batch servers 1064, content search servers 1068, query servers 1082, file servers 1086, access control system (ACS) servers 1080, batch servers 1084, and app servers 1088. Also, the pod 1044 may include database instances 1090, quick file systems (QFS) 1092, and indexers 1094. Some or all communication between the servers in the pod 1044 may be transmitted via the switch 1036.

In some implementations, the app servers 1088 may include a framework dedicated to the execution of procedures (e.g., programs, routines, scripts) for supporting the construction of applications provided by the on-demand database service environment 1000 via the pod 1044. One or more instances of the app server 1088 may be configured to execute all or a portion of the operations of the services described herein.

In some implementations, as discussed above, the pod 1044 may include one or more database instances 1090. A database instance 1090 may be configured as an MTS in which different organizations share access to the same database, using the techniques described above. Database information may be transmitted to the indexer 1094, which may provide an index of information available in the database 1090 to file servers 1086. The QFS 1092 or other suitable filesystem may serve as a rapid-access file system for storing and accessing information available within the pod 1044. The QFS 1092 may support volume management capabilities, allowing many disks to be grouped together into a file system. The QFS 1092 may communicate with the database instances 1090, content search servers 1068 and/or indexers 1094 to identify, retrieve, move, and/or update data stored in the network file systems (NFS) 1096 and/or other storage systems.

In some implementations, one or more query servers 1082 may communicate with the NFS 1096 to retrieve and/or update information stored outside of the pod 1044. The NFS 1096 may allow servers located in the pod 1044 to access information over a network in a manner similar to how local storage is accessed. Queries from the query servers 1022 may be transmitted to the NFS 1096 via the load balancer 1028, which may distribute resource requests over various resources available in the on-demand database service environment 1000. The NFS 1096 may also communicate with the QFS 1092 to update the information stored on the NFS 1096 and/or to provide information to the QFS 1092 for use by servers located within the pod 1044.

In some implementations, the content batch servers 1064 may handle requests internal to the pod 1044. These requests may be long-running and/or not tied to a particular customer, such as requests related to log mining, cleanup work, and maintenance tasks. The content search servers 1068 may provide query and indexer functions such as functions allowing users to search through content stored in the on-demand database service environment 1000. The file servers 1086 may manage requests for information stored in the file storage 1098, which may store information such as documents, images, basic large objects (BLOBs), etc. The query servers 1082 may be used to retrieve information from one or more file systems. For example, the query system 1082 may receive requests for information from the app servers 1088 and then transmit information queries to the NFS 1096 located outside the pod 1044. The ACS servers 1080 may control access to data, hardware resources, or software resources called upon to render services provided by the pod 1044. The batch servers 1084 may process batch jobs, which are used to run tasks at specified times. Thus, the batch servers 1084 may transmit instructions to other servers, such as the app servers 1088, to trigger the batch jobs.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of present disclosure.

Figure 11:
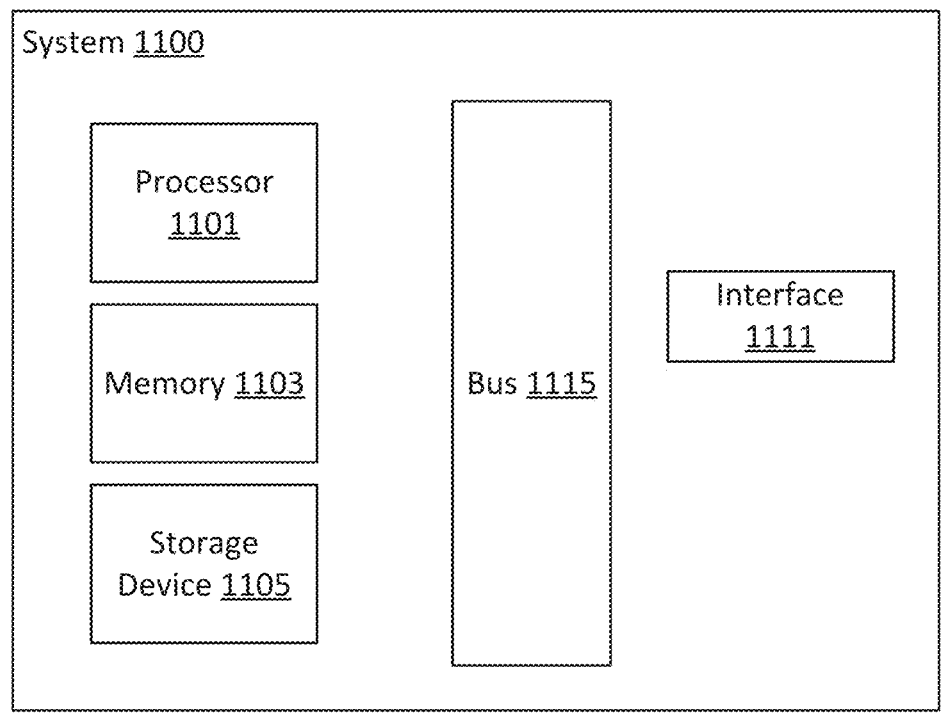
FIG. 11 illustrates one example of a computing device.

FIG. 11 illustrates one example of a computing device. According to various embodiments, a system 1100 suitable for implementing embodiments described herein includes a processor 1101, a memory module 1103, a storage device 1105, an interface 1111, and a bus 1115 (e.g., a PCI bus or other interconnection fabric.) System 1100 may operate as a variety of devices such as an application server, a database server, or any other device or service described herein. Although a particular configuration is described, a variety of alternative configurations are possible. The processor 1101 may perform operations such as those described herein. Instructions for performing such operations may be embodied in the memory 1103, on one or more non-transitory computer readable media, or on some other storage device. Various specially configured devices can also be used in place of or in addition to the processor 1101. The interface 1111 may be configured to send and receive data packets over a network. Examples of supported interfaces include, but are not limited to: Ethernet, fast Ethernet, Gigabit Ethernet, frame relay, cable, digital subscriber line (DSL), token ring, Asynchronous Transfer Mode (ATM), High-Speed Serial Interface (HSSI), and Fiber Distributed Data Interface (FDDI). These interfaces may include ports appropriate for communication with the appropriate media. They may also include an independent processor and/or volatile RAM. A computer system or computing device may include or communicate with a monitor, printer, or other suitable display for providing any of the results mentioned herein to a user.

Any of the disclosed implementations may be embodied in various types of hardware, software, firmware, computer readable media, and combinations thereof. For example, some techniques disclosed herein may be implemented, at least in part, by computer-readable media that include program instructions, state information, etc., for configuring a computing system to perform various services and operations described herein. Examples of program instructions include both machine code, such as produced by a compiler, and higher-level code that may be executed via an interpreter. Instructions may be embodied in any suitable language such as, for example, Apex, Java, Python, C++, C, HTML, any other markup language, JavaScript, ActiveX, VBScript, or Perl. Examples of computer-readable media include, but are not limited to: magnetic media such as hard disks and magnetic tape; optical media such as flash memory, compact disk (CD) or digital versatile disk (DVD); magneto-optical media; and other hardware devices such as read-only memory ("ROM") devices and random-access memory ("RAM") devices. A computer-readable medium may be any combination of such storage devices.

In the foregoing specification, various techniques and mechanisms may have been described in singular form for clarity. However, it should be noted that some embodiments include multiple iterations of a technique or multiple instantiations of a mechanism unless otherwise noted. For example, a system uses a processor in a variety of contexts but can use multiple processors while remaining within the scope of the present disclosure unless otherwise noted. Similarly, various techniques and mechanisms may have been described as including a connection between two entities. However, a connection does not necessarily mean a direct, unimpeded connection, as a variety of other entities (e.g., bridges, controllers, gateways, etc.) may reside between the two entities.

In the foregoing specification, reference was made in detail to specific embodiments including one or more of the best modes contemplated by the inventors. While various implementations have been described herein, it should be understood that they have been presented by way of example only, and not limitation. For example, some techniques and mechanisms are described herein in the context of on-demand computing environments that include MTSs. However, the techniques of the present invention apply to a wide variety of computing environments. Particular embodiments may be implemented without some or all of the specific details described herein. In other instances, well known process operations have not been described in detail in order not to unnecessarily obscure the present invention. Accordingly, the breadth and scope of the present application should not be limited by any of the implementations described herein, but should be defined only in accordance with the claims and their equivalents.

The invention claimed is:

1. A method comprising:
   receiving a request to update a designated one of a plurality of wire web component in a graphical user interface (GUI) being presented on a web page rendered in a web browser on a display device, the designated wire web component including a custom HTML element presenting a representation of a designated data value;
   identifying via a processor application procedure interface (API) through which to update the designated data value by accessing a wire web component graph representation that includes a plurality of nodes, each of the wire web components being represented by a respective one of the nodes, each of the data values corresponding to a respective data field represented in the wire web component graph representation, each data field being associated with at least one of a plurality of APIs represented in the wire web component graph representation;
   determining one or more updated data values by communicating with the identified API over a network and via a communications interface; and
   dynamically updating the representation of the designated data value based on the wire web component graph representation after the web page is rendered.

2. The method recited in claim 1, wherein the request to update the designated wire web component is received from a remote server via the communications interface.

3. The method recited in claim 2, wherein the request to update the designated wire web component indicates that one or more of the data values has changed since the GUI was initially presented on the display device.

4. The method recited in claim 1, wherein the request to update the designated wire web component is generated by the processor based on a triggering event.

5. The method recited in claim 4, wherein the triggering event comprises passage of a designated period of time.

6. The method recited in claim 4, wherein the triggering event comprises detecting a designated user input event created based on user input received via the GUI.

7. The method recited in claim 4, wherein the triggering event comprises detecting a change in a designated portion of the GUI that does not include the wire web component.

8. The method recited in claim 1, wherein updating the graphical user interface comprises applying a data transformation procedure to a designated one of the updated data values to produce an updated component-level view of the designated data value.

9. The method recited in claim 8, wherein a document object model (DOM) tree associated with the graphical user interface is updated when it is determined that the updated component-level view of the designated data value differs from a previous component-level view of the designated data value.

10. The method recited in claim 1, wherein each of a first subset of the nodes corresponds to a respective one of a plurality of wire web components, wherein each of a second subset of the nodes corresponds to a respective one of the data fields, and wherein each of a third subset of the nodes corresponds to a respective application procedure interface (API).

11. The method recited in claim 1, wherein the designated wire web component is associated with a wire web component definition implemented via computing programming language code, and wherein the wire web component definition includes a template implemented via Hypertext Markup Language (HTML).

12. The method recited in claim 11, wherein the wire web component graph is constructed in part by parsing a respective wire web component definition for each of a plurality of wire web components.

13. A computing device configured to perform a method comprising:
   receiving a request to update a designated one of a plurality of wire web component in a graphical user interface (GUI) being presented on a web page rendered in a web browser on a display device, the designated wire web component including a custom HTML element presenting a representation of a designated data value;
   identifying via a processor an application procedure interface (API) through which to update the designated data value by accessing a wire web component graph representation that includes a plurality of nodes, each of the wire web components being represented by a respective one of the nodes, each of the data values corresponding to a respective data field represented in the wire web component graph representation, each data field being associated with at least one of a plurality of APIs represented in the wire web component graph representation;
   determining one or more updated data values by communicating with the identified API over a network and via a communications interface; and
   dynamically updating the representation of the designated data value based on the wire web component graph representation after the web page is rendered.

14. The computing device recited in claim 13, wherein the request to update the designated wire web component is received from a remote server via the communications interface, and wherein the request to update the designated wire web component indicates that one or more of the data values has changed since the GUI was initially presented on the display device.

15. The computing device recited in claim 13, wherein the request to update the designated wire web component is generated by the processor based on a triggering event.

16. The computing device recited in claim 15, wherein the triggering event comprises passage of a designated period of time.

17. The computing device recited in claim 15, wherein the triggering event comprises detecting a designated user input event created based on user input received via the GUI.

18. The computing device recited in claim 15, wherein the triggering event comprises detecting a change in a designated portion of the GUI that does not include the wire web component.

19. One or more non-transitory computer readable media having instructions stored thereon for performing a method, the method comprising:
   receiving a request to update a designated one of a plurality of wire web component in a graphical user interface (GUI) being presented on a web page rendered in a web browser on a display device, the designated wire web component including a custom HTML element presenting a representation of a designated data value;
   identifying via a processor an application procedure interface (API) through which to update the designated data value by accessing a wire web component graph representation that includes a plurality of nodes, each of the wire web components being represented by a respective one of the nodes, each of the data values corresponding to a respective data field represented in the wire web component graph representation, each data field being associated with at least one of a plurality of APIs represented in the wire web component graph representation;

determining one or more updated data values by communicating with the identified API over a network and via a communications interface; and dynamically updating the representation of the designated data value based on the wire web component graph representation after the web page is rendered.

20. The one or more non-transitory computer readable media recited in claim 19, wherein the request to update the designated wire web component is received from a remote server via the communications interface, and wherein the request to update the designated wire web component indicates that one or more of the data values has changed since the GUI was initially presented on the display device.

* * * * *